US006184290B1

(12) United States Patent
Ahmed et al.

(10) Patent No.: US 6,184,290 B1
(45) Date of Patent: Feb. 6, 2001

(54) BLOCK COPOLYMER COMPOSITIONS CONTAINING SUBSTANTIALLY INERT THERMOELASTIC EXTENDERS

(75) Inventors: Wasif K. Ahmed, Fresno, TX (US); Antonio Batistini, Zurich; Stephen R. Betso, Horgen, both of (CH); Martin J. Guest, Terneuzen (NL); Thoi H. Ho, Lake Jackson, TX (US); George W. Knight, Lake Jackson, TX (US); Deepak R. Parikh, Lake Jackson, TX (US); Rajen M. Patel, Lake Jackson, TX (US)

(73) Assignee: The Dow Chemical Company, Midland, MI (US)

( * ) Notice: Under 35 U.S.C. 154(b), the term of this patent shall be extended for 0 days.

(21) Appl. No.: 08/979,388

(22) Filed: Nov. 26, 1997

Related U.S. Application Data

(60) Continuation of application No. 08/482,347, filed on Jun. 7, 1995, now abandoned, which is a division of application No. 08/298,238, filed on Mar. 29, 1994, now abandoned, which is a continuation-in-part of application No. 08/252,489, filed on Jun. 1, 1994, now abandoned.

(51) Int. Cl.[7] .................................................. C08L 47/00
(52) U.S. Cl. ................................................................ 525/98
(58) Field of Search ..................................................... 525/98

(56) References Cited

U.S. PATENT DOCUMENTS

| | | |
|---|---|---|
| 3,231,635 | 1/1966 | Holden et al. ........................ 260/880 |
| 3,645,992 | 2/1972 | Elston ................................. 260/80.78 |
| 4,302,554 | 11/1981 | Nabeta et al. .......................... 525/71 |
| 4,479,989 | 10/1984 | Mahal .................................... 428/35 |
| 4,509,821 | 4/1985 | Stenger ............................... 350/96.23 |
| 4,668,752 | 5/1987 | Tominari et al. .................. 526/348.2 |
| 4,748,206 | 5/1988 | Nogiwa et al. ........................ 525/88 |
| 4,835,218 | 5/1989 | Yoshimura et al. ................... 525/98 |
| 5,091,471 | 2/1992 | Graves et al. .......................... 525/90 |
| 5,093,422 | * 3/1992 | Himes .................................... 525/98 |
| 5,216,074 | 6/1993 | Imai et al. .............................. 525/66 |
| 5,260,126 | * 11/1993 | Collier, IV et al. ................. 428/283 |
| 5,272,236 | 12/1993 | Lai et al. ........................... 526/348.5 |
| 5,278,272 | 1/1994 | Lai et al. ........................... 526/348.5 |
| 5,340,840 | 8/1994 | Park et al. .............................. 521/60 |

FOREIGN PATENT DOCUMENTS

| | | | |
|---|---|---|---|
| 54-120646 | 9/1979 | (JP) | ................................. C08L/25/10 |
| 54-120658 | 9/1979 | (JP) | ................................. C08L/23/16 |
| 92/08764 | 5/1992 | (WO) | ........................... C09J/123/16 |
| WO 93/08221 A2 | 4/1993 | (WO) | ............................. C08F/10/00 |
| WO 94/06859 A1 | 3/1994 | (WO) | ............................. C08L/23/04 |
| 92/18263 | 8/1994 | (WO) | ................................. C08J/5/18 |
| WO 94/25515 A1 | 11/1994 | (WO) | ............................... C08J/9/14 |
| WO 95/27756 | 10/1995 | (WO) | ............................. C08L/53/00 |

OTHER PUBLICATIONS

N. R. Legge et al., "Thermoplastic Elastomers", pp. 50–53, Hanser Publishers, Munich Vienna New York.

* cited by examiner

*Primary Examiner*—Peter D. Mulcahy

(57) ABSTRACT

The present invention is at least a two-component thermoplastic elastomeric composition comprising at least one block copolymer wherein the composition has essentially the same comparative elasticity, high temperature serviceability and hardness as the unmodified, undiluted (neat) block copolymer portion of the composition. The composition also shows enhanced thermal stability and processibility and is well suited for fabricating elastic moldings, films and fibers as well as for formulating with asphalts, adhesives and sealants. The novel thermoplastic elastomeric composition comprises (a) from about 50 to about 99 percent by weight of at least one block copolymer and (b) about 1 to about 50 percent by weight of at least one ethylene interpolymer having a density from about 0.855 g/cc to about 0.905 g/cc, wherein the ethylene interpolymer in the amount employed is a substantially inert extender of the block copolymer and the composition is further characterized as having:

i. storage moduli throughout the range of −26° C. to 24° C. of less than about $3.5 \times 10^9$ dynes/cm$^2$, ii. a ratio of storage modulus at −26° C. to storage modulus at 24° C. of less than about 4, and iii. storage moduli at −26° C. and 24° C. about 0.2 to about 3 times higher than the storage moduli at −26° C. and 24° C., respectively, of the neat block copolymer portion of the composition.

11 Claims, 13 Drawing Sheets

Set temperature: 240°C
Composition Example 12

Set temperature: 220°C
Composition Example 11

Set temperature: 220°C
Composition Example 22

BLOCK COPOLYMER COMPOSITIONS CONTAINING SUBSTANTIALLY INERT THERMOELASTIC EXTENDERS

CROSS-REFERENCE TO RELATED APPLICATION

This is a continuation of application Ser. No. 08/482.347 filed Jun. 7, 1995 which is a Rule 1.60 divisional of pending application Ser. No. 08/298,238, filed Aug. 29, 1994, which is a continuation-in-part of patent application Ser. No. 08/252,489, filed Jun. 1, 1994, and is related to U.S. Pat. No. 5,272,236, Ser. No. 07/776,130, filed Oct. 15, 1991; U.S. Pat. No. 5,278,272, Ser. No. 07/939,281, filed Sep. 2, 1992; pending application Ser. No. 07/945,034, filed Sep. 15, 1992; and pending application Ser. No. 08/045,330, filed Apr. 8, 1993.

FIELD OF THE INVENTION

This invention relates to thermoplastic elastomeric compositions containing substantially inert thermoelastic extenders. In particular, the invention relates to thermoplastic elastomeric compositions comprising block copolymers in blend combination with substantially inert ethylene interpolymers.

BACKGROUND OF THE INVENTION

Various thermoplastic elastomeric compositions are well-known and include thermoplastic urethanes, thermoplastic polyesters, amorphous polypropylenes, chlorinated polyethylenes, ethylene/propylene rubbers, crosslinked and uncrosslinked EPDM (ethylene-propylene-nonconjugated diene monomer) systems, and styrene block copolymers. Styrene block copolymers, which are sold under the brand names of Vector, Kraton and Solprene as supplied respectively by Dexco Polymers, Shell Oil Company and Phillips Petroleum, are considered to be very versatile thermoplastic elastomers.

Styrene block copolymers are also recognized as strong, flexible high performance elastomers that do not require vulcanization and yet exhibit excellent elasticity over a wide range of service temperatures. Due to their unique molecular structure and versatility, styrene block copolymers are used in a wide spectrum of enduses such as moldable goods, automotive interior and exterior parts, medical devices, and the like.

Styrene block copolymers are available with linear, diblock, triblock and radial molecular structures. Each polymer molecule consists of a styrenic block segment and a rubber monomer block segment. The rubber segment may consist of saturated or unsaturated monomer units such as ethylene/butene and ethylene/propylene, or butadiene and isoprene, respectively. Styrene block copolymers having saturated rubber monomer segments typically exhibit improved thermal, oxidative and processing stability, better weather resistance, and higher temperature serviceability when compared to copolymers consisting of unsaturated rubber monomer segments.

Although styrene block copolymers are very useful, they have a number of deficiencies. These materials are relatively expensive and due to their fairly difficult manufacturing requirements are often in short supply. Moreover, due to the inability of their particles or pellets to expediently melt and fuse together with the application of heat, styrene block copolymers with saturated rubber monomer segments are fairly difficult to formulate and process. Processing in conventional equipment such as, for example, a Banbury mixer, is typically characterized by an initial induction or delay period which adds to processing costs. As another disadvantage, this delay, which in effect constitutes an additional heat history, can contribute to the overall thermal and processing instability of the copolymer.

Because of high material costs, shortages and processing difficulties, it is desirable to provide blend components that can extend available quantities of styrene block copolymers without substantially altering the key elastic properties of the latter. It is also desirable to provide component materials that function as processing aids or fusion promoters whereby the delay times associated with thermally processing styrene block copolymers having saturated rubber monomer segments can be substantially reduced. Further, it is desirable to improve the properties of block copolymers having unsaturated rubber monomer block segments without the higher manufacturing costs typically associated with block copolymers having saturated rubber monomer segments.

There has been a long felt need to mitigate the above difficulties associated with conventional thermoplastic elastomeric materials but, unfortunately, prior art efforts to do so have not been entirely successful. Prior art proposals to facilitate the use of ordinary thermoelastic materials tend to involve curing steps or multicomponent compositions with extensive formulating requirements. For example, Shell Oil Company in its Kraton brochure indicates the Kraton materials are highly extendable presumably by specific combinations of involving fillers, resins and oils. On page 3 of the brochure, Kraton D compounds and Kraton G compounds are said to contain other suitable ingredients. Further, where other ingredients are used, including fillers and oils in combination or alone, it is expected that special handling and equipment would be required for uniform admixing with solid block copolymer resins.

Where ordinary thermoelastic materials, such as, for example, ethylene/vinyl acetate (EVA) copolymers, are used as single-component extenders for block copolymers, the elastic, rheological, stability or hardness properties of the final composition tend to vary substantially relative to neat compositions of the respective block copolymer. Still other prior art disclosures involving ethylene/α-olefin interpolymers in combination with block copolymers such as, for example, U.S. Pat. No. 5,272,236, which discloses blends of substantially linear ethylene interpolymers and styrene butadiene copolymers, and *Plastics Technology* August 1994, page 54, which mentions similar blends useful for molded goods, do not teach or render obvious the specific requirements that enable the use of such materials as substantially inert extenders, nor disclose the surprising benefits that can be realized by doing so.

SUMMARY OF THE INVENTION

It has been discovered that the combination of at least one block copolymer and with specified amounts of at least one particular ethylene interpolymer yields a thermoplastic elastomeric composition having essentially the same elastic and hardness properties as the block copolymer portion of the composition. The particular effect of the ethylene interpolymer can be described as a substantially inert thermoelastic extender of the styrene block copolymer.

Thus one aspect of the present invention is a thermoplastic elastomeric composition comprising (a) from about 50 to about 99 percent by weight of the total composition of at least one block copolymer and (b) from about 1 to about 50 percent by weight of the total composition of at least one thermoelastic ethylene interpolymer having a density from about 0.855 g/cc to about 0.905 g/cc, wherein the thermoelastic ethylene interpolymer in the amount employed is a substantially inert thermoelastic extender of the block copolymer and the composition is further characterized as having:

i. storage moduli throughout the range of −26° C. to 24° C. of less than about $3.5 \times 10^9$ dynes/cm$^2$,
  ii. a ratio of storage modulus at −26° C. to storage modulus at 24° C. of less than about 4, and
  iii. storage moduli at −26° C. and 24° C. about 0.2 to about 3 times higher than the storage moduli at −26° C. and 24° C., respectively, of the neat block copolymer portion of the composition.

Another aspect of the present invention is a method of making a fabricated article in the form of a film, fiber and molding from the novel thermoplastic elastomeric composition.

In still another aspect, the present invention provides a fabricated article in the form of a film, fiber or molding made from the novel thermoplastic elastomeric composition.

In addition to utility as a substantially unaltered neat block copolymer, the novel composition also exhibits the benefit of improved processability. Particular ethylene interpolymers, functioning as fusion promoters and processing aids, substantially reduce the processing delay times characteristic of styrene block copolymers having saturated rubber monomer units.

As still another benefit of the present invention, the novel composition also exhibits improved stability when exposed to stresses such as heat, shear and ultraviolet radiation relative to a comparative styrene block copolymer having unsaturated rubber monomer units.

The functioning of select ethylene interpolymers as substantially inert thermoelastic extenders is surprising since, although such thermoelastic polymers are generally elastic, their properties can differ substantially from those of block copolymers.

While the invention is not limited to any particular theory of operation, the surprising enhancements are believed to be due to the unique compatibility obtainable with elastic and, preferably, compositionally uniform ethylene interpolymers, particularly homogeneously branched ethylene interpolymers. Such utility and improvements are not obtainable with ordinary thermoelastic materials such as, for example, ethylene/vinyl acetate (EVA) copolymers even at high vinyl acetate levels, nor with ethylene interpolymers having polymer densities substantially greater than about 0.905 g/cc.

DETAILED DESCRIPTION OF THE INVENTION

Figure 1:
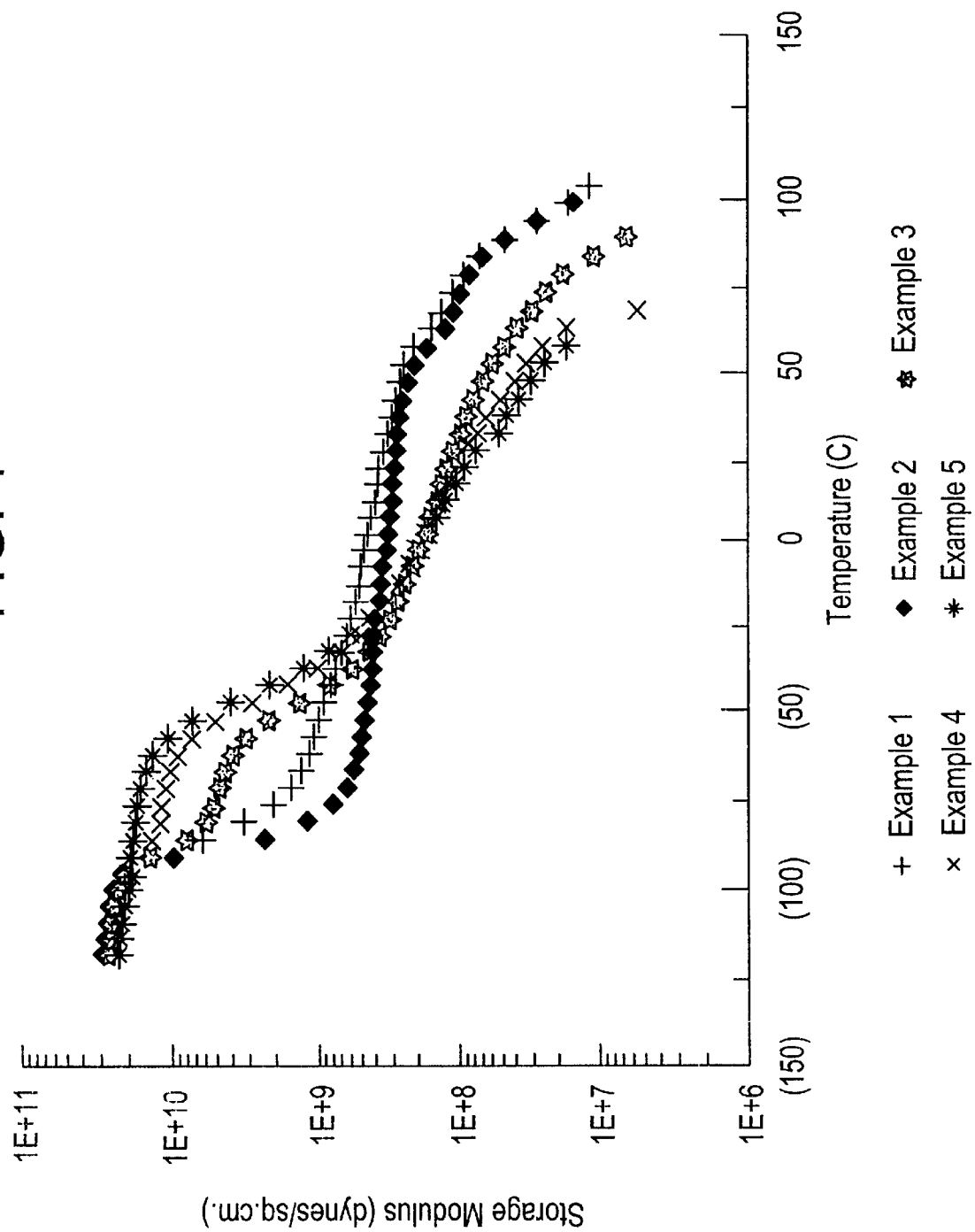
FIG. 1 is a plot of the dynamic storage modulus versus temperature for Examples 1–5 as determined using a Rheometrics Solid Analyzer RSA-II.

The referred block copolymer has block segments of styrenic units and block segments of rubber monomer units such as butadiene, isoprene, ethylene/propylene and ethylene/butene. The preferred substantially inert thermoelastic ethylene interpolymer is a homogeneously branched ethylene interpolymer, and more preferably a substantially linear ethylene polymer characterized as having:

(a) a melt flow ratio, $I_{20}/I_2$, $\geq 5.63$,
  (b) a molecular weight distribution, $M_w/M_n$, defined by the equation:

$M_w/M_n \leq (I_{10}/I_2) - 4.63$, and (c) a critical shear rate at the onset of surface melt fracture of at least 50 percent greater than the critical shear rate at the onset of surface melt fracture of a comparative linear ethylene polymer having about the same $I_2$ and $M_w/M_n$.

The term "interpolymer" is used herein to indicate a copolymer, or a terpolymer, or the like, where, at least one other comonomer is polymerized with ethylene to make the interpolymer.

The term "thermoplastic" is used herein to indicate polymers or polymer compositions that are substantially thermally extrudable or deformable albeit relatively aggressive conditions may be required.

The term "thermoelastic" is used herein to mean a thermoplastic resin having elastic properties, wherein elastic properties means the resin has a thin film (i.e., $\leq 4$ mils) one percent secant modulus of less than about 15,000 psi, or an elongation at break of greater than about 450%, or the following dynamic mechanical storage modulus (E') properties:

(a) storage moduli in the range of about −26° C. to about 24° C. of less than about $5 \times 10^9$ dynes/cm$^2$, and
  (b) a ratio of storage modulus at −26° C. to storage modulus at 24° C. of less than about 8.

The term "elastomeric" or "elastomer" is used herein to mean a material or composition having dynamic mechanical storage moduli (E') in the range of about −26° C. to about 24° C. of less than about $3.5 \times 10^9$ dynes/cm$^2$, and a ratio of storage modulus at −26° C. to storage modulus at 24° C. of less than about 4, wherein a "perfectly elastic" material would have a ratio of 1.

The term "substantially inert thermoelastic extender" is used herein to mean a thermoelastic polymer that at specified addition amounts does not substantially alter either the elasticity, rheology, high temperature serviceability or hardness that is characteristic of the neat block copolymer that is admixed with the thermoelastic polymer to prepare the novel composition of the present invention. The effect of the select thermoelastic polymer is such that the novel composition is characterized as having (1) storage moduli at −26° C. and 24° C. no less than about 0.2 times lower and no more than about 3 times higher than the storage moduli at −26° C. and 24° C. of the respective neat block copolymer (i.e., storage moduli of the composition at −26° C. and 24° C. is about 0.2 to about 3 times higher than the storage moduli at −26° C. and 24° C., respectively, of the neat block copolymer portion of the composition), (2) a dynamic complex viscosity the throughout the shear rate range of 10 to 1001 sec of about 0 to about 50 percent lower than the respective neat block copolymer, and (3) less than or equal to about ±3 units difference in Shore A hardness (as measured by ASTM-D2240 when compared to the respective neat block copolymer.

Suitable substantially inert thermoelastic extenders for use in preparing the thermoplastic elastomeric compositions of the present invention are ethylene interpolymers, preferably homogeneously branched ethylene interpolymers, and more preferably substantially linear ethylene interpolymers. Preferred ethylene interpolymers also containing at least one $C_3$–$C_{20}$ α-olefin.

The terms "ultra low density polyethylene" (ULDPE), "very low density polyethylene" (VLDPE) and "linear very low density polyethylene" (LVLDPE) have been used interchangeably in the polyethylene art to designate the polymer subset of linear low density polyethylenes having a density less than or equal to about 0.915 g/cc. The term "linear low density polyethylene" (LLDPE) is then applied to those linear polyethylenes having a density above about 0.915 g/cc. Only ethylene/α-olefin interpolymers having a polymer density less than about 0.905 g/cc are a part of the present invention. As such, the family known as LLDPE is not considered a part of to the present invention although such may be employed to affect other enhancements.

The terms "heterogeneous" and "heterogeneously branched" are used herein in the conventional sense in reference to a linear ethylene interpolymer having a comparatively low short chain branching distribution index. The short chain branching distribution index (SCBDI) is defined as the weight percent of the polymer molecules having a comonomer content within 50 percent of the median total molar comonomer content. The short chain branching distribution index of polyolefins that are crystallizable from solutions can be determined by well-known temperature rising elution fractionation techniques, such as those described by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1–2, pp. 107–119 (1985), or U.S. Pat. No. 4,798,081, the disclosures of all which are incorporated herein by reference. Heterogeneously branched linear ethylene interpolymers and particularly, heterogeneously branched linear ethylene/α-olefin interpolymers typically have a SCBDI less than about 30 percent.

The preparation of heterogeneously branched linear ethylene interpolymers is not a critical aspect the present invention. Heterogeneously branched linear ethylene interpolymers useful in the present invention, such as the class known interchangeably as ULDPE and VLDPE, may be prepared by any of the well-known methods such the methods described by Anderson et al. in U.S. Pat. No. 4,076,698, the disclosure of which is incorporated by reference, or described in Kirk-Othmer Encyclopedia of Science and Technology, Volume 14, pages 242–282 (2n ed. 1967).

Suitable unsaturated comonomers useful for polymerizing with ethylene to prepare suitable heterogeneously branched linear ethylene interpolymers include, for example, ethylenically unsaturated monomers, conjugated or non-conjugated dienes, polyenes, etc. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred.

Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene. The interpolymer can be amorphous or semi-crystalline with a random, atactic, isotactic or syndiotactic molecular structure, but preferably the interpolymer is a random semi-crystalline polymer. Preferred heterogeneously branched linear ethylene interpolymers are ethylene interpolymerized with at least one $C_3C_{20}$ α-olefin and most preferably, ethylene/1-octene copolymers.

Commercial examples of heterogeneously branched linear interpolymers suitable for use in the present invention include ATTANE ULDPE polymers supplied by the Dow Chemical Company and FLEXOMER VLDPE polymers supplied by Union Carbide Corporation.

The term "homogeneously branched" is defined herein to mean that (1) the (α-olefin comonomer(s) is (are) randomly distributed within a given molecule, (2) substantially all of the copolymer molecules have the same ethylene-to-comonomer ratio, (3) the interpolymer is characterized by a narrow short chain branching distribution where the short chain branching distribution index is greater than 30 percent, more preferably greater than 50 percent, and (4) the interpolymer essentially lacks a measurable high density (crystalline) polymer fraction as measured by known fractionation techniques such as, for example, a method that involves polymer fractional elutions as a function of temperature.

The homogeneously branched ethylene interpolymers for useful admixing with block copolymers can be linear ethylene interpolymers, or preferably, substantially linear ethylene interpolymers. Both the substantially linear and the homogeneously branched linear ethylene interpolymers are ethylene interpolymers having a short chain branching distribution index (SCBDI) greater than about 30 percent. The substantially linear interpolymers have a single melting points as opposed to traditional Ziegler polymerized polymers having two or more melting points as determined using differential scanning calorimetry (DSC).

The homogeneously branched linear ethylene interpolymers useful for admixing with block copolymers to prepare the thermoplastic elastomeric composition of the present invention are ethylene polymers which do not have long chain branching, but do have short chain branches derived from the comonomer polymerized into the interpolymer which are homogeneously distributed both within the same polymer chain and between different polymer chains. That is, homogeneously branched linear ethylene interpolymers have an absence of long chain branching just as is the case for the linear low density polyethylene polymers or linear high density polyethylene polymers made using uniform branching distribution polymerization processes as described, for example, by Elston in U.S. Pat. No. 3,645,992, the disclosure of which is incorporated herein by reference.

The homogeneously branched linear ethylene interpolymers are not high pressure, free-radical initiated polyethylene which is well-known to those skilled in the art to have numerous long chain branches, nor are they traditional heterogeneously branched linear low density polyethylene. Suitable unsaturated comonomers useful for polymerizing with ethylene to prepare suitable homogeneously branched linear ethylene interpolymers include, for example, ethylenically unsaturated monomers, conjugated or non-conjugated dienes, polyenes, etc. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylenes, vinylbenzocyclobutanes, butadienes, isoprenes, pentadienes, hexadienes, octadienes, and cycloalkenes, e.g., cyclopentene, cyclohexene and cyclooctene. Typically, the homogeneously branched linear ethylene interpolymer is a copolymer, wherein ethylene is copolymerized with one $C_3$–$C_{20}$ α-olefin. Most preferably, the homogeneously branched linear ethylene interpolymer is a copolymer of ethylene and 1-octene.

The preparation of homogeneously branched linear ethylene/α-olefin interpolymers is not a critical aspect of the present invention. Homogeneously branched linear ethylene/α-olefin interpolymers can be prepared in conventional polymerization processes using Ziegler-type catalysts such as, for example, zirconium and vanadium catalyst systems as well as using metallocene catalyst systems such as, for example, those based on hafnium. Ewen et al. disclosure in U.S. Pat. No. 4,937,299 and Tsutsui et al. disclosure in U.S. Pat. No. 5,218,071, both of which are incorporated herein by reference are, are illustrative.

Commercial examples of homogeneously branched linear interpolymers suitable for use in the present invention include TAFMER polymers supplied by the Mitsui Chemical Company and EXACT polymers supplied by Exxon Chemical Company.

The substantially linear ethylene interpolymers used in the present invention are a unique class of compounds that are further defined in application Ser. No. 07/776,130 filed Oct. 15, 1991, now U.S. Pat. No. 5,272,236, and in application Ser. No. 07/939,281 filed Sep. 2, 1992, now U.S. Pat. No. 5,278,272, both of which are incorporated herein by reference in their entirety.

Substantially linear ethylene interpolymers are a completely different class of homogeneously branched ethylene polymers. They differ substantially from the well-known class of conventional homogeneously branched linear ethylene interpolymers described by Elston in U.S. Pat. No. 3,645,992, and moreover, they are not in the same class as conventional heterogeneous Ziegler polymerized linear ethylene polymers (e.g., ultra low density polyethylene, linear low density polyethylene or high density polyethylene made, for example, using the technique disclosed by Anderson et al. in U.S. Pat. No. 4,076,698), nor are they in the same class as high pressure, free-radical initiated highly branched high pressure polyethylenes such as, for example, low density polyethylene (LDPE), ethylene-acrylic acid (EAA) copolymers and ethylene-vinyl acetate (EVA) copolymers.

The substantially linear ethylene interpolymers useful in this invention have excellent processability, even though they have relatively narrow molecular weight distribution. Surprisingly, the melt flow ratio ($I_{10}/I_2$) of the substantially linear ethylene interpolymers can be varied widely and essentially independently of the polydispersity index (i.e., the molecular weight distribution, $M_w/M_n$). This surprising behavior is completely contra to homogeneously branched linear ethylene interpolymers such as those described, for example, by Elston in U.S. Pat. No. 3,645,992 and heterogeneously branched conventional Ziegler polymerized linear polyethylene interpolymers such as those described, for example, by Anderson et al. in U.S. Pat. No. 4,076,698. Both linear ethylene interpolymer types have rheological properties such that as the polydispersity index increases, the $I_{10}/I_2$ value also increases.

The term "substantially linear" means that the polymer backbone is substituted with about 0.01 long chain branch/1000 carbons to about 3 long chain branches/1000 carbons, more preferably from about 0.01 long chain branches/1000 carbons to about 1 long chain branch/1000 carbons, and especially from about 0.05 long chain branch/1000 carbons to about 1 long chain branch/1000 carbons.

The term "long chain branching" is defined herein as a chain length of at least about 6 carbons, above which the length cannot be distinguished using $^{13}C$ nuclear magnetic resonance spectroscopy, yet the long chain branch can be about the same length as the length of the polymer backbone.

Long chain branching is determined by using 13C nuclear magnetic resonance (NMR) spectroscopy and is quantified using the method described by Randall (*Rev. Macromol. Chem. Phys.*, Chpt. 29, Vols. 2&3, p. 285–297), the disclosure of which is incorporated herein by reference.

Suitable unsaturated comonomers useful for polymerizing with ethylene to prepare suitable substantially linear ethylene interpolymers include, for example, ethylenically unsaturated monomers, conjugated or non-conjugated dienes, polyenes, etc. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene. Preferred substantially linear ethylene interpolymers for use in the present invention are interpolymers of ethylene with at least one $C_3$–$C_{20}$ α-olefin and/or $C_4$–$C_{18}$ diolefin. Copolymers of ethylene and a $C_3$–$C_{20}$ α-olefin of are especially preferred.

The density of the ethylene interpolymers for use in the present invention, as measured in accordance with ASTM D-792, is generally in the range from about 0.855 grams/cubic centimeter (g/cc) to about 0.905 g/cc, preferably about 0.86 g/cc to about 0.89 g/cc, more preferably about 0.865 g/cc to about 0.885 g/cc. The density limitation is critical for obtaining the required compatibility and inertness of the ethylene interpolymer. At densities above 0.905 g/cc, ethylene interpolymers are generally non-elastomeric. At densities below 0.855 g/cc, the interpolymer is fairly tacky and difficult to process and handle.

The molecular weight of the ethylene interpolymers is conveniently indicated using a melt index measurement according to ASTM D-1238, Condition 190° C/2.16 kilogram (kg), formerly known as "Condition E" and also known as $I_2$. Melt index is inversely proportional to the molecular weight of the polymer. Thus, the higher the molecular weight, the lower the melt index, although the relationship is not linear. The melt index for the ethylene interpolymers useful herein is generally from about 0.01 gram/10 minutes (g/10 min.) to about 100 g/10 min., preferably from about 0.1 g/10 min. to about 40 g/10 min., and especially from about 1 g/10 min. to about 10 g/10 min.

Other measurements useful in characterizing the molecular weight of ethylene interpolymers involve melt index determinations with higher weights, such as, for common example, ASTM D-1238, Condition 190° C./10 kg (formerly known as "Condition N" and also known as $I_{10}$). "Melt flow ratio" is defined herein as the ratio of a higher weight melt index determination to a lower weight determination, and for measured $I_{10}$ and the $I_2$ melt index values, the melt flow ratio is conveniently designated as $I_{10}/I_2$. The $I_{10}/I_2$ of both heterogeneous and homogeneously branched linear ethylene interpolymers is generally greater than about 7.

Unlike the linear ethylene interpolymers of the present invention which possess no substantial long chain branching, for the substantially linear ethylene interpolymers used herein, the melt flow ratio actually indicates the degree of long chain branching, i.e., the higher the $I_{10}/I_2$ melt flow ratio, the more long chain branching in the polymer. The $I_{10}/I_2$ ratio of the substantially linear ethylene interpolymers is preferably at least about 5.63, and especially from about 5.63 to about 20, and most especially from about 6 to about 15.

The "rheological processing index" (PI) which is defined herein as the apparent viscosity in kpoise of a polymer measured by a gas extrusion rheometer (GER), can also be used to distinguish substantially linear ethylene interpolymers. The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated by reference herein in their entirety. GER experiments are performed at a temperature of 190° C., at nitrogen pressures between 250 to 5500 psig (17–379 bars) using about a 0.754 mm diameter, 20:1 L/D die with an entrance angle of 180°. For the substantially linear ethylene polymers used herein, the PI is the apparent viscosity (in kpoise) of a material measured by GER at an apparent shear stress of $2.15 \times 10^6$ dyne/cm$^2$. The unique substantially linear ethylene interpolymers described herein preferably have a PI in the range of about 0.01 kpoise to about 50 kpoise, preferably about 15 kpoise or less. The substantially linear ethylene interpolymers used herein have a PI less than or equal to about 70% of the PI of a comparative linear ethylene interpolymer (for example, a homogeneously branched linear interpolymer as described by Elston in U.S. Pat. No. 3,645,992, or supplied by Exxon Chemical Company as EXACT, or supplied by Mitsui Chemical Company as TAFMER) having about the same $I_2$ and $M_w/M_n$.

To more fully characterize the unique rheological behavior of substantially linear ethylene interpolymers, S. Lai and G. W. Knight recently introduced (*ANTEC '93 Proceedings*, INSITE™ Technology Polyolefins (ITP)—New Rules in the Structure/Rheology Relationship of Ethylene α-Olefin Copolymers, New Orleans, La., May 1993) another rheological measurement, the Dow Rheology Index (DRI), which expresses a polymer's "normalized relaxation time as the result of long chain branching." DRI ranges from 0 for polymers which do not have any measurable long chain branching (e.g., TAFMER and EXACT products) to about 15 and is independent of melt index. In general, for low to medium pressure ethylene polymers (particularly at lower densities) DRI provides improved correlations to melt elasticity and high shear flowability relative to correlations of the same attempted with melt flow ratios, and for the substantially linear ethylene interpolymers of this invention, DRI is preferably at least about 0.1, and especially at least about 0.5, and most especially at least 0.8. DRI can be calculated from the equation:

$$DRI = (3652879 * \tau_O^{1.00649}/\eta_O - 1)/10$$

where $\tau_O$ is the characteristic relaxation time of the material and $\eta_O$ is the zero shear viscosity of the material. Both $\tau_O$ and $\eta_O$ are the "best fit" values to the Cross equation, i.e.

$$\eta/\eta_O = 1/(1+(\gamma^* \tau_O)^{1-n})$$

where n is the power law index of the material, and $\eta$ and $\gamma$ are the measured viscosity and shear rate, respectively. Baseline determination of viscosity and shear rate data are obtained using a Rheometrics Mechanical Spectrometer (RMS-800) under dynamic sweep mode from 0.1 to 100 radians/second at 160° C. and a Gas Extrusion Rheometer (GER) at extrusion pressures from 1,000 psi to 5,000 psi (corresponding shear stress from 0.086 to 0.43 MPa) using a 0.754 millimeter diameter, 20:1 L/D die at 190° C. Specific material determinations can be performed from 140 to 190° C. as required to accommodate melt index variations.

In addition to the onset of draw resonance and various rheological characterizations, ethylene polymers can also be distinguished by melt flow consequences that are manifested as solid state surface defects. Unlike draw resonance which is observed during drawing and pertains to irregularities in the extrudate dimension, an apparent shear stress versus apparent shear rate plot is used to identify the "melt fracture" phenomena which pertains to surface irregularities. According to Ramamurthy in the *Journal of Rheology*, 30(2), 337–357, 1986, above a certain critical shear rate (in contrast to a critical draw rate for the draw resonance phenomena), the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." In this disclosure, the onset of surface melt fracture (OSMF) is characterized at the beginning of losing extrudate gloss at which the surface roughness of the extrudate can only be detected by 40x magnification. The critical shear rate at the onset of surface melt fracture for the substantially linear ethylene interpolymers is at least 50 percent greater than the critical shear rate at the onset of surface melt fracture of a comparative linear ethylene interpolymer (for example, a homogeneously branched linear interpolymer as described by Elston in U.S. Pat. No. 3,645,992) having about the same $I_2$ and $M_w/M_n$.

Gross melt fracture occurs at unsteady extrusion flow conditions, and ranges in detail from regular (alternating rough and smooth, helical, etc.) to random distortions. For commercial acceptability, (e.g., for use as films, coatings and moldings), surface defects should be minimal, if not absent, for good film/molding quality and overall properties. The critical shear stress at the onset of gross melt fracture for the substantially linear ethylene interpolymers used in the present invention is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

The distribution of comonomer branches for ethylene interpolymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science*, Poly. Phys. Ed., Vol. 20, p. 441 (1982), or in U.S. Pat. No. 4,798,081, both disclosures of which are incorporated herein by reference. The SCBDI or CDBI for the substantially linear ethylene interpolymer and the homogeneously branched linear ethylene interpolymer used in the present invention is preferably greater than about 30 percent and especially greater than about 50 percent.

The substantially linear ethylene interpolymer and the homogeneously branched linear ethylene interpolymer used in this invention essentially lack a measurable "high density" fraction as measured by the TREF technique. These homogeneously branched ethylene interpolymers do not contain a polymer fraction with a degree of branching less than or equal to 2 methyls/1000 carbons.

The "high density polymer fraction" can also be described as a polymer fraction with a degree of branching less than about 2 methyls/1000 carbons. Among other benefits, the lack of high density polymer fraction permits enhanced elasticity for the interpolymers themselves and improved compatibility when admixed with the block copolymer of the present invention.

The substantially linear ethylene interpolymers are also characterized by a single DSC melting peak. However, for substantially linear ethylene interpolymers having a density in the range of about 0.875 g/cc to about 0.905 g/cc, the single melting peak may show, depending on DSC equipment sensitivity, a "shoulder" or a "hump" on it's low melting side that constitutes less than 12 percent, typically, less than 9 percent, and more typically less than of 6 percent of the total heat of fusion of the polymer. This artifact is believed to be due to intra-polymer chain variations and is discerned on the basis of the slope of the single melting peak varying monotonically through the melting region of the artifact. Such artifacts occur within 34° C., typically within 27° C., and more typically within 20° C. of the melting point of the single melting peak. The single melting peak is determined using a differential scanning calorimeter standardized with indium and deionized water. The method involves about 5–7 mg sample sizes, a "first heat" to about 180° C. which is held for 4 minutes, a cool down at 10°/min. to −30° C. which is held for 3 minutes, and heat up at 10° C/min. to 140° C. for the "second heat". The single melting peak is taken from the "second heat" heat flow vs. temperature curve. Total heat of fusion of the polymer is calculated from the area under the curve. The heat of fusion attributable to this artifact, if present, can be determined using an analytical balance and weight-percent calculations.

The molecular weight distribution of the ethylene interpolymers used in the present invention are determined by gel permeation chromatography (GPC) on a Waters 150 high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which 0.3 percent by weight solutions of the interpolymer samples are prepared for injection. The flow rate is 1.0 milliliter/minute and the operating temperature is 140° C. with a 100-microliter injection size.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968, incorporated herein by reference) to derive the following equation:

$$M_{polyethylene} = a^*(M_{polystyrene})^b.$$

In this equation, a=0.4316 and b=1.0. Weight average molecular weight, $M_w$, is calculated in the usual manner according to the following formula: $Mw = R\ w_i^* M_i$, where $w_i$ and $M_i$ are the weight fraction and molecular weight, respectively, of the $i^{th}$ fraction eluting from the GPC column.

For the substantially inert ethylene interpolymers used in the present invention, the $M_w/M_n$ is generally from about 1.5 to about 8, and especially from about 1.7 to about 6.5. For the homogeneously branched linear ethylene interpolymer and substantially linear ethylene interpolymer, the $M_w/M_n$ is preferably from about 1.5 to about 2.5.

Single site polymerization catalysts, (e.g., the monocyclopentadienyl transition metal olefin polymerization catalysts described by Canich in U.S. Pat. No. 5,026,798 or by Canich in U.S. Pat. No. 5,055,438, or described by Stevens et al. in U.S. Pat. No. 5,064,802, the disclosure of all of which are incorporated herein by reference) can be used to polymerize the substantially linear ethylene interpolymers, so long as the catalysts are used consistent with the methods described in U.S. Pat. No. 5,2727,236 and in U.S. Pat. No. 5,278,272. Such polymerization methods are also described in PCT/US 92/08812 (filed Oct. 15, 1992), the disclosure of which is incorporated herein by reference. However, substantially linear ethylene interpolymers are preferably made by using suitable constrained geometry catalysts, especially constrained geometry catalysts as disclosed in U.S. application Ser. No. 545,403, filed Jul. 3, 1990; Ser. No. 758,654, filed Sep. 12, 1991, now issued U.S. Pat. No. 5,132,380; and Ser. No. 758,660, filed Sep. 12, 1991, the teachings of all of which are incorporated herein by reference.

Suitable cocatalysts for use herein include but are not limited to, for example, polymeric or oligomeric aluminoxanes, especially methyl aluminoxane or modified methyl aluminoxane (made, e.g., as described in U.S. Pat. No. 5,041,584, U.S. Pat. No. 4,544,762, U.S. Pat. No. 5,015,749, and/or U.S. Pat. No. 5,041,585, the disclosures of each of which are incorporated herein by reference) as well as inert, compatible, non-coordinating, ion forming compounds. Preferred cocatalysts are inert, non-coordinating, boron compounds.

The polymerization conditions for manufacturing substantially linear ethylene interpolymers used herein are preferably those useful in the solution polymerization process, although the application of the present invention is not limited thereto. Slurry and gas phase polymerization processes are also useful for preparing suitable substantially linear interpolymers, provided the proper catalysts and polymerization conditions are employed. To polymerize the substantially linear interpolymers useful in the invention, different catalysts can be used, but the polymerization process should be operated such that the substantially linear polymers are formed. That is, not all polymerization conditions inherently make the substantially linear ethylene polymers, even when the same catalysts are used.

For example, in one embodiment of a polymerization process useful in making the novel substantially linear ethylene interpolymers, a continuous process is used, as opposed to a batch process.

Preferably, for substantially linear ethylene interpolymers, the polymerization is performed in a continuous solution polymerization process. Generally, manipulation of $I_{10}/I_2$ while holding $M_w/M_n$ relatively low for producing the substantially linear ethylene polymers using constrained geometry catalyst technology described herein is a function of reactor temperature and/or ethylene concentration. Reduced ethylene concentration and higher temperature generally produces higher $I_{10}/I_2$. Generally, as the ethylene concentration of the reactor decreases, the polymer concentration increases. For substantially linear ethylene interpolymers, the polymer concentration for a continuous solution polymerization process is preferably above about 5 weight percent of the reactor contents, especially above about 6 weight percent of the reactor contents. Generally, the polymerization temperature of the continuous process, using constrained geometry catalyst technology, is from about 20° C. to about 180° C. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 6 percent by weight of the reactor contents, and most especially not more than about 4 percent by weight of the reactor contents.

Multiple reactor polymerization processes can also be used in making the ethylene interpolymers of the present invention, such as those processes disclosed in copending applications Ser. No. 07/815,716, filed Dec. 30, 1991 and Ser. No. 08/010,958, filed Jan. 29, 1993, and in U.S. Pat. No. 3,914,342, the disclosures of all of which are incorporated herein by reference. The multiple reactors can be operated in series or in parallel or a combination thereof and/or with different Ziegler type catalyst or single-site catalysts employed in the different reactors.

The term "block copolymer" is used herein to mean elastomers having at least one block segment of an hard polymer unit and at least one block segment of an rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. The structure of the block copolymers useful in the present invention is not critical and can be of the linear or radial type, either diblock or triblock, or any combination of thereof. Preferably, the predominant structure is that of triblocks and more preferably that of linear triblocks.

The preparation of the block copolymers useful herein is not the subject of the present invention. Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers forming a part of the composition of this invention.

Suitable block copolymers having unsaturated rubber monomer units includes, but is not limited to, styrene-butadiene (SB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene, and the like.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and a-methylstyrene, and styrene is particularly preferred.

Block copolymers with unsaturated rubber monomer units may comprise homopolymers of butadiene or isoprene and copolymers of one or both of these two dienes with a minor amount of styrenic monomer. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles a regular copolymer block of ethylene and 1-butene (EB). If the conjugated diene employed is isoprene, the resulting hydrogenated product is or resembles a regular copolymer block of ethylene and propylene (EP). Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers, and the like.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the styrenic aromatic double bonds. Preferred block copolymers are those where at least 99% of the aliphatic double bonds are hydrogenated while less than 5% of the aromatic double bonds are hydrogenated.

The proportion of the styrenic blocks is generally between about 8 and 65% by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of about 5,000 to about 125,000, preferably from about 7,000 to about 60,000 while the rubber monomer block segments will have average molecular weights in the range of about 10,000 to about 300,000, preferably from about 30,000 to about 150,000. The total average molecular weight of the block copolymer is typically in the range of about 25,000 to about 250,000, preferably from about 35,000 to about 200,000. These molecular weights are most accurately determined by tritium counting methods or osmotic pressure measurements.

Further, the various block copolymers suitable for use in the present invention may be modified by graft incorporation of minor amounts of functional groups, such as, for example, maleic anhydride by any of the methods well known in the art.

Block copolymers useful in the present invention are commercially available, such as, for example, supplied by Shell Chemical Company under the designation of KRATON and supplied by Dexco Polymers under the designation of VECTOR.

Generally, the novel thermoplastic elastomeric composition of the present invention comprises (a) from about 50 to about 99 percent by weight of the total composition of at least one block copolymer and (b) from about 1 to about 50 percent by weight of the total composition of at least one ethylene interpolymer. Preferably, the novel composition comprises (a) from about 60 to about 95, and most preferably, from about 70 to about 90 percent by weight of the total composition of at least one block copolymer and (b) from about 5 to about 40, and most preferably, from about 10 to about 30 percent by weight of the total composition of at least one ethylene interpolymer.

The novel thermoplastic elastomeric compositions of the present invention are further characterized as having:

(a) a storage modulus (E') throughout the range of about $-26°$ C. to about $24°$ C. of less than about $3.5 \times 10^9$ dynes/cm$^2$, more preferably less than $3 \times 10^9$ dynes/cm$^2$ (b) a ratio of storage modulus at $-26°$ C. to storage modulus at $24°$ C. of less than about 4, preferably less than about 3, and (c) storage moduli at $-26°$ C. and $24°$ C. about 0.2 to about 3 times, preferably about 0.25 to about 2.6 times, more preferably about 0.4 to about 2.2 times higher than the storage moduli at $-26°$ C. and $24°$ C., respectively, of the neat block copolymer portion of the composition.

Additives such as antioxidants (e.g., hindered phenolics (e.g., Irganox 1010), phosphites (e.g., Irgafos 168)), cling additives (e.g., polyisobutylene), antiblock additives, colorants, pigments, waxes, nucleating agents, extender oils, fillers, tackifers, and the like can also be included in the present compositions, to the extent that they do not interfere with the substantial inertness or other enhancements discovered by Applicants.

The compositions of the present invention are compounded by any convenient method, including dry blending the individual components and subsequently melt mixing, either directly in the extruder used to make the finished article, or by pre-melt mixing in a separate extruder or mixer such as, for example, a Haake unit or a Banbury mixer.

The novel compositions of the present invention can be fabricated into articles such as fibers, films, coatings and moldings by any of the known methods in the art suitable for thermoplastic compositions. The novel compositions are particularly suitable for preparing fabricated articles from molding operations. Suitable molding operations for forming useful fabricated articles or parts from the novel compositions, including various injection molding processes (e.g., that described in Modern Plastics Encyclopedia/89, Mid October 1988 Issue, Volume 65, Number 11, on pp. 264–268, "Introduction to Injection Molding" and on pp. 270–271, "Injection Molding Thermoplastics", the disclosures of which are incorporated herein by reference), blow molding processes (e.g., that described in Modern Plastics Encyclopedia/89, Mid October 1988 Issue, Volume 65, Number 11, on pp. 217–218, "Extrusion-Blow Molding", the disclosure of which is incorporated herein by reference) and profile extrusion.

Some of the fabricated articles include sporting goods such as wet suits and golf grips, containers such as for food or other household articles, footwear counters, uppers and soles, automotive articles such as facia, trim and side molding, medical goods such as gloves, tubing, IV bags and artificial limbs, industrial goods such as gaskets and tool grips, personal care items such as elastic films and fibers for diapers, textiles such as nonwoven fabrics, electronic goods such as key pads and cable jacketing, and construction goods such as roofing materials and expansion joint materials.

The present novel composition is also useful as a compounding ingredient or additive for such uses as asphalt modifications for crack repairing and roofing, polymer processing, impact and surface modifications, sealant and adhesive formulations, oil gel viscosity modifications and rubber extender/binder compounding.

The novel compositions of the present invention can also be further combined with other natural or synthetic resins to improve other properties. Suitable natural or synthetic resins include, but are not limited to, rubbers, linear low density polyethylene (LLDPE), high density polyethylene (HDPE), low density polyethylene (LDPE), ethylene-vinyl acetate copolymer (EVA), ethylene-carboxylic acid copolymers, ethylene acrylate copolymers, polybutylene (PB), nylons, polycarbonates, polyesters, polypropylene, ethylene-propylene interpolymers such as ethylene-propylene rubber, EPDM, chlorinated polyethylene, thermoplastic vulcanates, polyurethanes, as well as graft-modified olefin polymers, and combinations thereof.

The invention will be further illustrated by means of the following examples without limiting the invention thereto.

EXAMPLES

In various evaluations the several different types of block copolymers and thermoelastic polymers are studied to determined their individual and combined properties. Property testing and determinations include elastic and rheology as measured by dynamic mechanical and dynamic rheological techniques, Shore A hardness and processibility and process stability as measured by Haake torque technique. The description of the various block copolymers and thermoelastic polymers that are studied are listed below.

| Polymer | Description | Supplier |
|---|---|---|
| VECTOR 8508 | a styrene-butadiene-styrene block copolymer containing about 28% styrene by weight and having a melt flow rate of about 12 | Dexco Polymers. |
| VECTOR 4211 | a styrene-isoprene-styrene block copolymer containing 30% styrene by weight and having a melt flow rate of about 13 | Dexco Polymers |
| KRATON G1650 | a styrene-ethylene-butene-styrene block copolymer about containing 29% styrene by weight and having a melt flow rate of less than about 0.1 | Shell Chemical Company |
| ENGAGE EG8200 | a thermoelastic substantially linear ethylene/1-octene copolymer prepared using a constrained geometry catalyst system according to procedures disclosed in U.S. Pat. Nos. 5,272,236 and 5,278,236 and having a density of about 0.87 g/cc and a melt index, $I_2$, of about 5 g/10 minutes | The Dow Chemical Company |
| TAFMER P0480 | a thermoelastic homogeneously branched linear ethylene/propylene copolymer believed to be prepared using a vanadium catalyst system and having a density of about 0.87 g/cc and melt index, $I_2$, of about 1.0 g/10 minutes | Mitsui Chemical Company |
| EXACT 3027 | a thermoelastic homogeneously branched linear ethylene/butene copolymer believed to be prepared using a single-site catalyst system and having a melt index, $I_2$, of about 3.2 g/10 minutes and a density of about 0.902 g/cc | Exxon Chemical Company |
| ATTANE 4203 | a thermoelastic heterogeneously branched linear ethylene/1-octene interpolymer prepared using a conventional Ziegler catalyst system and having a density of about 0.905 g/cc and melt index, $I_2$, of about 0.8 g/10 minutes | The Dow Chemical Company |
| EVA | thermoelastic ethylene/vinyl acetate (EVA) copolymer containing about 18% by weight vinyl acetate and having a melt index, $I_2$, of about 3 g/10 minutes and a density of about 0.951 g/cc | — |

Blend Composition Preparations:

Blends of the various thermoelastic polymer with styrene block copolymers are prepared using a Haake mixer. Blends of thermoelastic polymers with VECTOR 8508 and VECTOR 4211 are prepared at 170° C. for 7 minutes at 60 rpm. The resins are dry blended before adding to Haake mixer. Antioxidant (Irganox B900) at 2000 ppm level is also added to the Haake mixing bowl. Blends of thermoelastic polymer with KRATON G1650 are prepared at 220° C. for 7 minutes at 60 rpm. A thin compression molded plaque of partially fused KRATON G1650 is prepared at 200° C. using a melt press. Strips of the plaque is added to the molten thermoelastic polymer already present in the mixing bowl.

Sample Preparation for Dynamic Mechanical and Rheological Measurements:

Samples for dynamic rheology studies are prepared in the form of circular disks using Haake torque blend compositions or from melt pressed pellets of the block copolymers as controls (i.e., no Haake torque exposure). The samples are prepared at 190° C. and are air-cooled to ambient room temperature of about 23° C.

Samples for dynamic mechanical studies are prepared in the form of thin films (about 15–20 mil thick) from the Haake blend or from melt pressed pellets of the block copolymers as controls (i.e., no Haake torque exposure). The samples are prepared at 190° C. and are cooled at 15° C./min to ambient room temperature of about 23° C.

Procedure for Dynamic Mechanical and Rheological Measurements:

The dynamic rheological properties of the samples are studied using a Rheometrics RMS800 rheometer. The frequency is varied from 0.1 radians/second to 100 radian/second while the sample/unit temperature is maintained at 190° C. in a nitrogen atmosphere. A strain of about 15% is also used for the dynamic rheology measurement. In a few cases where the viscosity of resins or blend composition are high, the strain is maintained at about 5%. According to the Cox-Mertz rule, the complex viscosity versus frequency data measured using the dynamic shear rheology is about equivalent to shear viscosity versus shear rate data, and as such, can provide useful information regarding the rheological properties of the resins and resultant blend compositions.

The dynamic mechanical properties of the samples are studied using Rheometrics Solids analyzer RSA-II. The dynamic mechanical properties of the sample are measured at 5° C. increments in a nitrogen atmosphere over a temperature range of about −120° C. to highest possible temperature at which sample either substantially melts or deforms. The experiments are conducted at a frequency of 10 radians/second and an initial strain of $7.0 \times 10^{-4}$. The sample dimensions are measured and are used in the calculations. The gauge length, that is the distance between the clamps holding the sample during testing, is about 22 mm.

Examples 1–5

In a Haake mixing bowl, several thermoplastic blend compositions are prepared using ENGAGE EG8200 and VECTOR 8508. The blends consist of VECTOR 8508 and ENGAGE EG8200 at weight percent ratios of 25/75, 50/50 and 75/25, and are prepared at 170° C. and collected from the Haake mixing bowl after a total mixing time of about 6 to 7 minutes. The samples are compression molded for dynamic mechanical determinations using the procedure described above.

The dynamic mechanical results are shown in FIG. 1. The storage modulus data at −26° C. and at 24° C., the −26° to 24° C. ratio and storage modulus increase relative to neat VECTOR 8508 are shown in Table 1.

TABLE 1

Elasticity of Styrene/Butadiene/Styrene Blends

| Example | Composition | Storage Modulus (E') at −26° C., dynes/cm² | Storage Modulus (E') at 24° C., dynes/cm² | −26°/24° C. Storage Modulus Ratio | Ratio of Blend to Neat Copolymer Storage Modulus at −26° C. | Ratio of Blend to Neat Copolymer Storage Modulus at 24° C. |
|---|---|---|---|---|---|---|
| 1 | 75% VECTOR 8508 25% ENGAGE EG8200 | 6.21 × 10⁸ | 3.58 × 10⁸ | 1.73 | 1.64 | 1.26 |
| 2* | 100% VECTOR 8508 | 3.79 × 10⁸ | 2.83 × 10⁸ | 1.34 | — | — |
| 3 | 50% VECTOR 8508 50% ENGAGE EG8200 | 3.50 × 10⁸ | 1.19 × 10⁸ | 2.94 | 0.92 | 0.42 |
| 4* | 25% VECTOR 8508 75% ENGAGE EG8200 | 4.92 × 10⁸ | 1.02 × 10⁸ | 4.82 | 1.30 | 0.36 |
| 5* | 100% ENGAGE EG8200 | 5.77 × 10⁸ | 8.92 × 10⁷ | 6.46 | 1.52 | 0.32 |

*Comparative example only; not an example of the present invention.

The dynamic mechanical data in FIG. 1 surprisingly reveals that addition of 25 and 50 weight percent ENGAGE EG8200 to VECTOR 8508 does not substantially alter the high temperature serviceability of the VECTOR 8508 block copolymer. That is, the neat block copolymer (Example 2) and the blend compositions comprising up to 50 weight percent ENGAGE EG8200 (Examples 1 and 3) maintain good integrity as indicated by a stable storage modulus at temperatures at least up to 50° C.).

Figure 2:
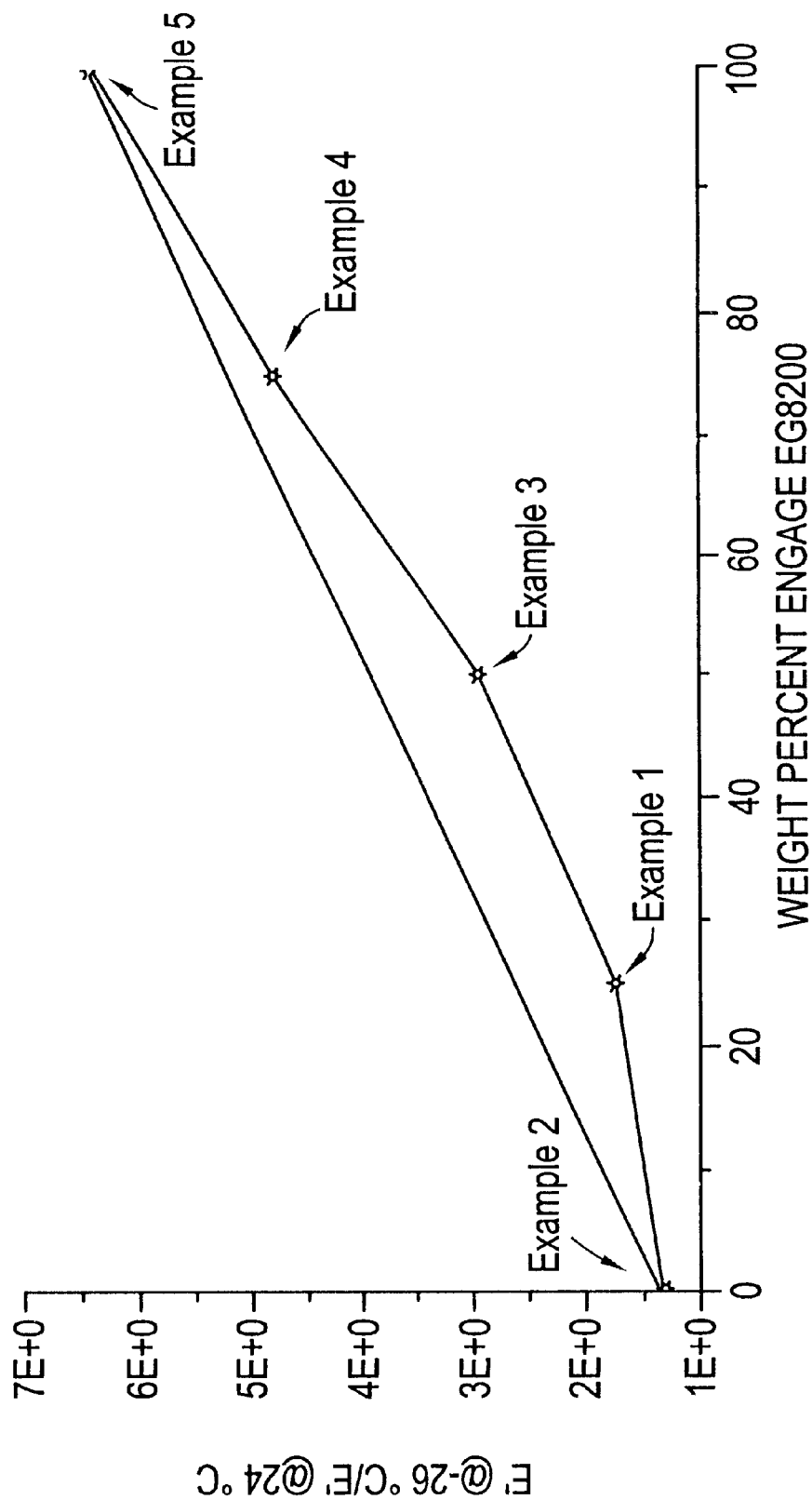
FIG. 2 is a plot of the dynamic storage modulus versus temperature for Examples 1–5 as predicted based on weight average contributions of the component materials.

FIG. 2 (which indicates the predicted dynamic mechanical response of the compositions based on weight average contributions of the component materials) and Table 1 show that the ratio of storage modulus at −26° C. to storage modulus at 24° C. does not increase as rapidly as expected based on weight average contribution of the two components. In fact these blend compositions are, surprisingly, more elastic than predicted, especially at a concentration of about 25 weight percent ENGAGE EG8200.

Table 1 also indicates that the storage modulus measured at −26° C. and 24° C. for the 25 weight percent ENGAGE EG8200 blend composition (Example 1) does not change significantly relative to neat block copolymer VECTOR 8508 at the same temperatures. The storage modulus at −26° C. and 24° C. for Examples 1 and 3 are only about 0.42 to about 1.64 times higher than the storage modulus at −26° C. and 24° C. of neat VECTOR 8508. Such storage modulus differences are considered insignificant and, thereby, exemplify effective use of ENGAGE EG8200 as an extender for VECTOR 8508.

A low −26° to 24° C. storage modulus ratio (i.e., less than about 4) in combination with stable, low storage moduli (i.e., less than about 3.5×10⁹ dynes/cm²) over the same temperature range indicates that the composition possesses good elasticity in the range of at least about −26° C. to about 24° C. This attribute is important for products that must maintain their shape, integrity and performance over the selected temperature range.

Figure 3:
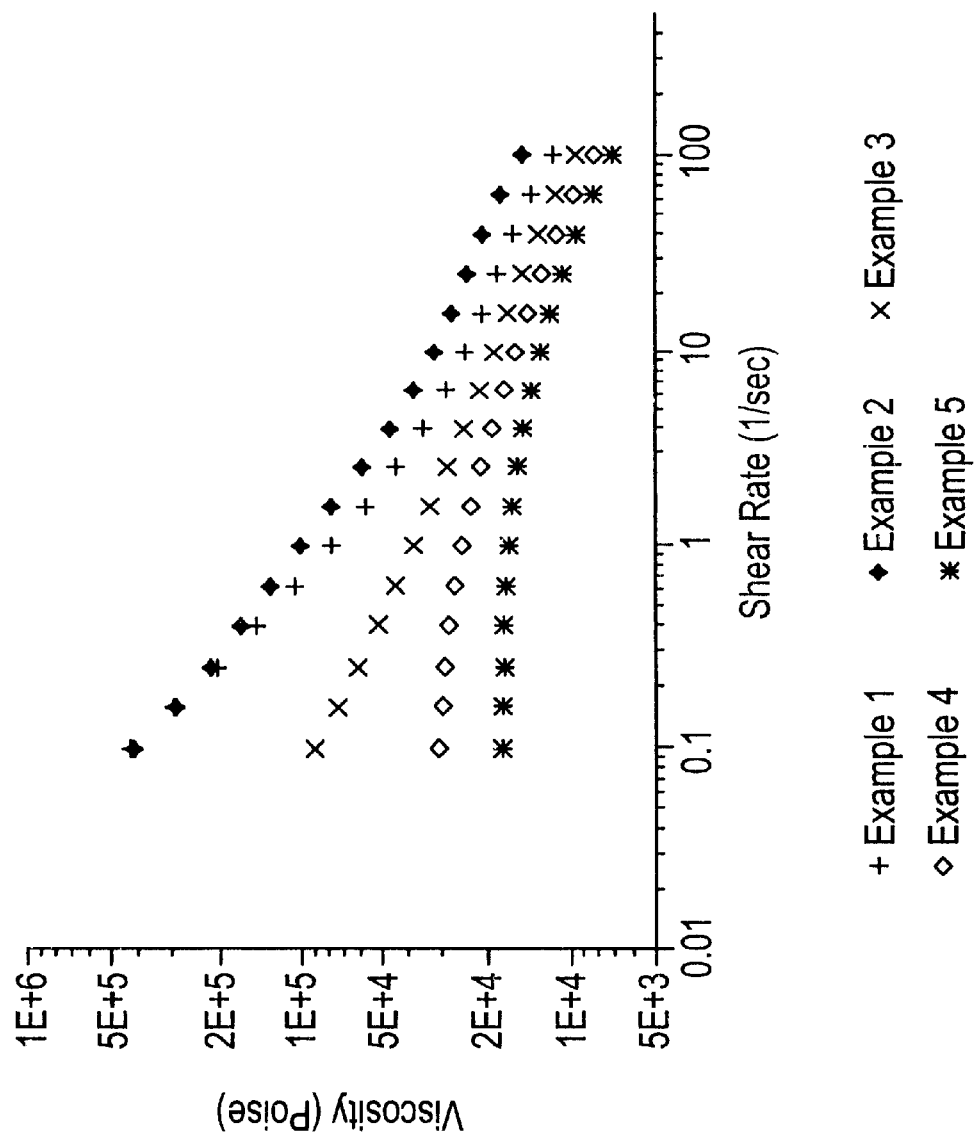
FIG. 3 is a plot of the dynamic complex viscosity versus shear rate for Examples 1–5 as determined using a Rheometrics Rheometer RMS-800 at 190° C.

Similar to the dynamic mechanical storage modulus results, FIG. 3 indicates the addition of amounts less than about 50 weight percent of ENGAGE EG8200 does not substantially alter the dynamic rheological properties of VECTOR 8508, i.e., the response is characteristic of the block copolymer and not that of the ethylene interpolymer. FIG. 3 indicates at low shear rates there is essentially no change in dynamic viscosity relative to the neat block copolymer and at high shears rates, there is only a slight decrease in viscosity, particularly when 25 weight percent of ENGAGE EG8200 is admixed with the block copolymer.

By not substantially altering the high temperature serviceability and dynamic mechanical and rheological properties of VECTOR 8508, these results indicate that ENGAGE EG8200 functions as substantially inert extender in blend combinations with the block copolymers.

Examples 6–10

Figure 4:
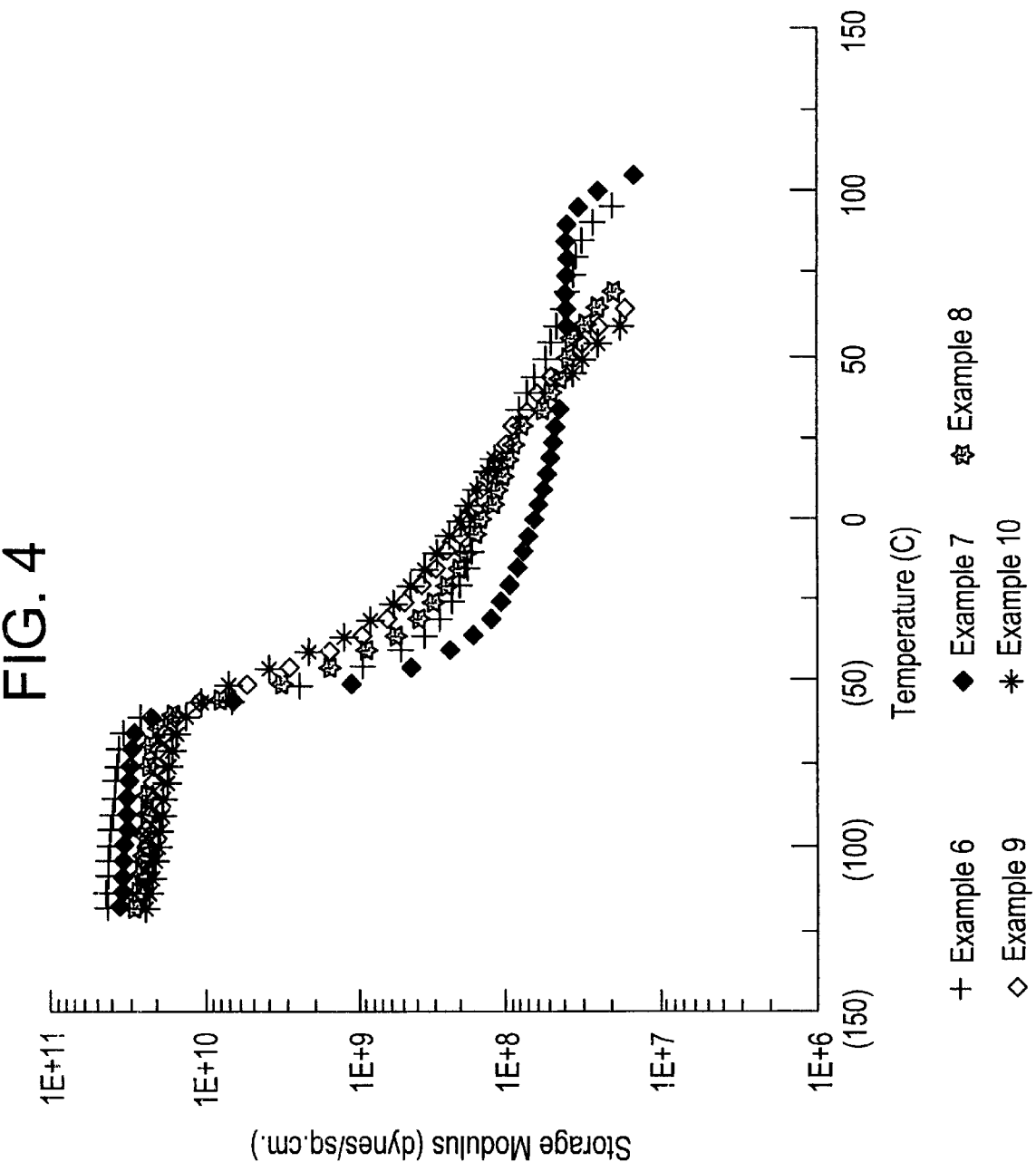
FIG. 4 is a plot of the dynamic storage modulus versus temperature for Examples 6–10 as determined using a Rheometrics Solid Analyzer RSA-II.
Figure 5:
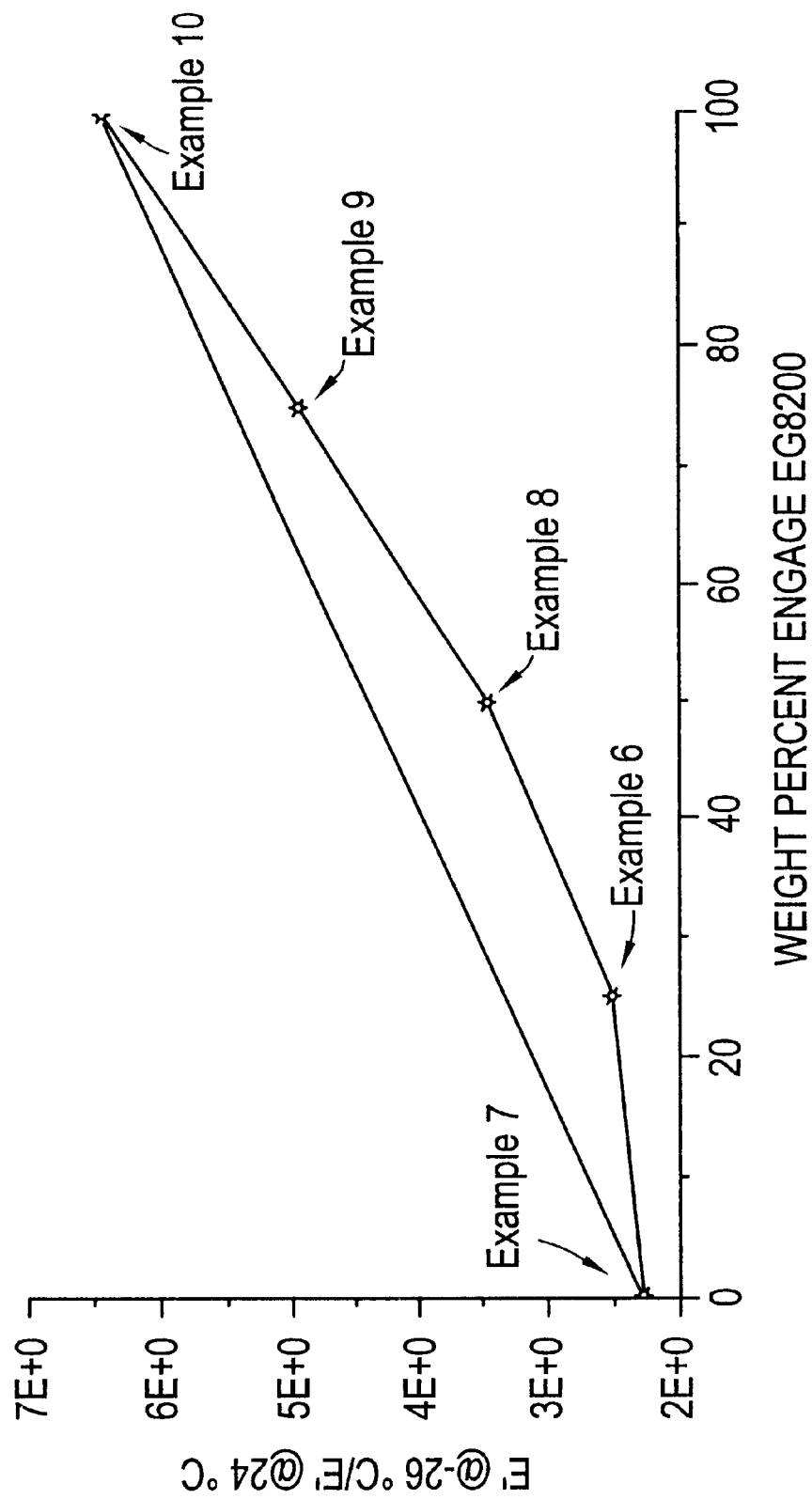
FIG. 5 is a plot of the dynamic storage modulus versus temperature for Examples 6–10 as predicted based on weight average contributions of the component materials.
Figure 6:
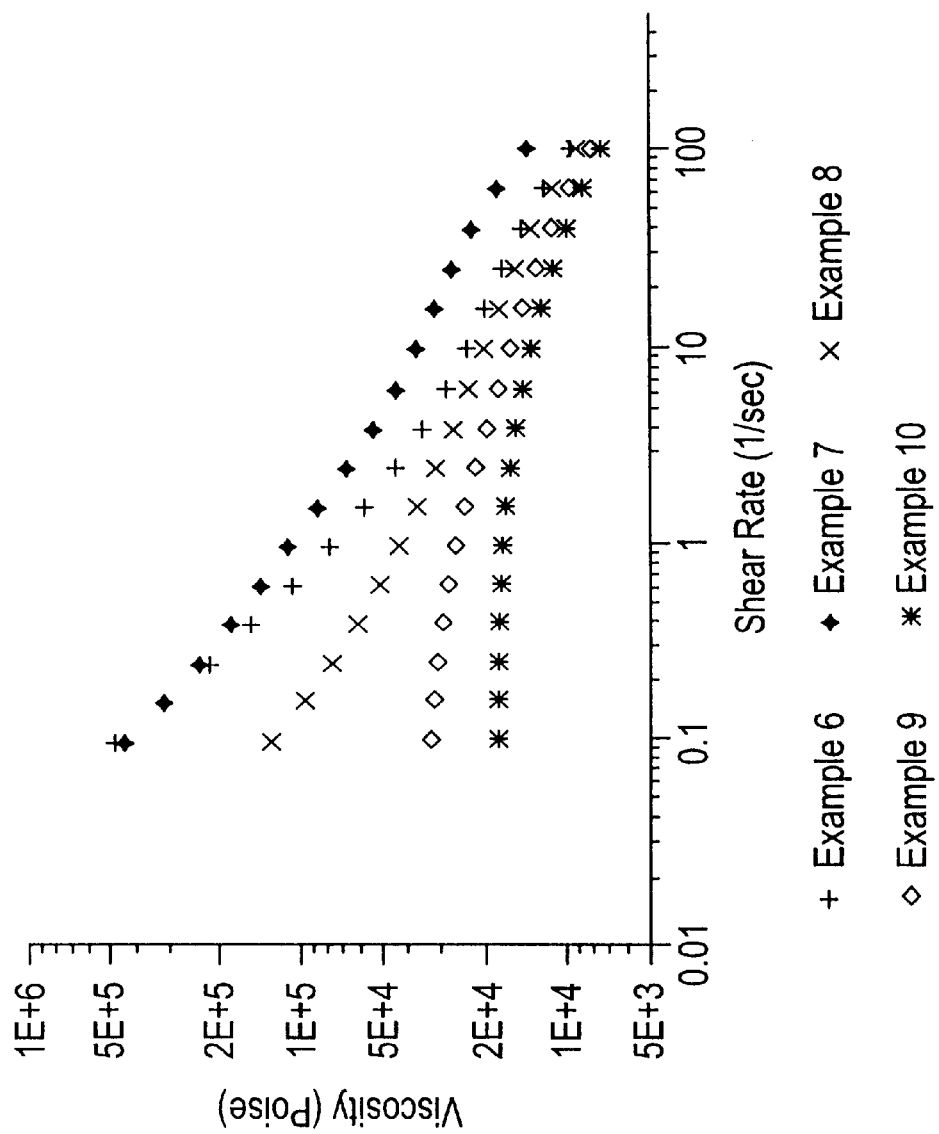
FIG. 6 is a plot of the dynamic complex viscosity versus shear rate for Examples 6–10 as determined using a Rheometrics Rheometer RMS-800 at 190° C.

Blends consisting of VECTOR 4211 and ENGAGE EG8200 at weight ratios 25/75, 50/50 and 75/25 are prepared in the same manner as described above for Examples 1–5. The samples are prepared for dynamic mechanical and rheological determinations using the procedure described above. The results are shown in FIGS. 4, 5 and 6. The storage modulus data at −26° C. and at 24° C. and the temperature to temperature storage modulus ratio as well as the blend composition to neat block copolymer storage modulus ratio are all shown in Table 2.

TABLE 2

Elasticity of Styrene/Isoprene/Styrene Blends

| Example | Composition | Storage Modulus (E') at −26° C., dynes/cm² | Storage Modulus (E') at 24° C., dynes/cm² | −26°/ 24° C. Storage Modulus Ratio | Ratio of Blend to Neat Copolymer Storage Modulus at −26° C. | Ratio of Blend to Neat Copolymer Storage Modulus at 24° C. |
|---|---|---|---|---|---|---|
| 6 | 75% VECTOR 4211 25% ENGAGE EG8200 | 2.26 × 10⁸ | 8.99 × 10⁷ | 2.51 | 2.13 | 1.95 |
| 7* | 100% VECTOR 4211 | 1.06 × 10⁸ | 4.60 × 10⁷ | 2.30 | — | — |
| 8 | 50% VECTOR 4211 50% ENGAGE EG8200 | 2.96 × 10⁸ | 8.55 × 10⁷ | 3.46 | 2.79 | 1.86 |
| 9* | 25% VECTOR 4211 75% ENGAGE EG8200 | 4.71 × 10⁸ | 9.51 × 10⁷ | 4.95 | 4.44 | 2.07 |
| 10* | 100% ENGAGE EG8200 | 5.77 × 10⁸ | 8.92 × 10⁷ | 6.46 | 5.44 | 1.94 |

*Comparative example only; not an example of the present invention.

FIG. 4 surprisingly reveals that addition of 25% and 50% ENGAGE EG8200 to VECTOR 4211 did not substantially alter the high temperature serviceability of the block copolymer. Table 2 and FIG. 5 show that the ratio of storage modulus at −26° C. to storage modulus at 24° C. for these samples do not substantially increase as predicted based on the weight percentage contributions of the two components. Similar to the above Examples 1 and 3, ENGAGE EG8200/ VECTOR 4211 blends comprising up to 50 weight percent ENGAGE EG8200 (Examples 6 and 8) are surprisingly more elastic than expected.

Also, the −24° to 24° C. storage modulus ratio of Examples 6 and 8 are less than 4 and their storage moduli at −26° C. and 24° C., which range from 1.86 to 2.79 times higher, are not substantially different from that of neat VECTOR 4211. Similar to the dynamic mechanical storage modulus results, FIG. 6 indicates the addition of amounts up to about 50 weight percent of ENGAGE EG8200 does not substantially alter the dynamic rheological properties of VECTOR 4211, particularly when 25 weight percent of ENGAGE EG8200 is admixed with the block copolymer. These elasticity and rheological results indicate that ENGAGE EG8200 functions as essentially as a substantially inert extender in blend combinations with VECTOR 4211, a styrene/isoprene/styrene block copolymer.

Examples 11–15

Figure 7:
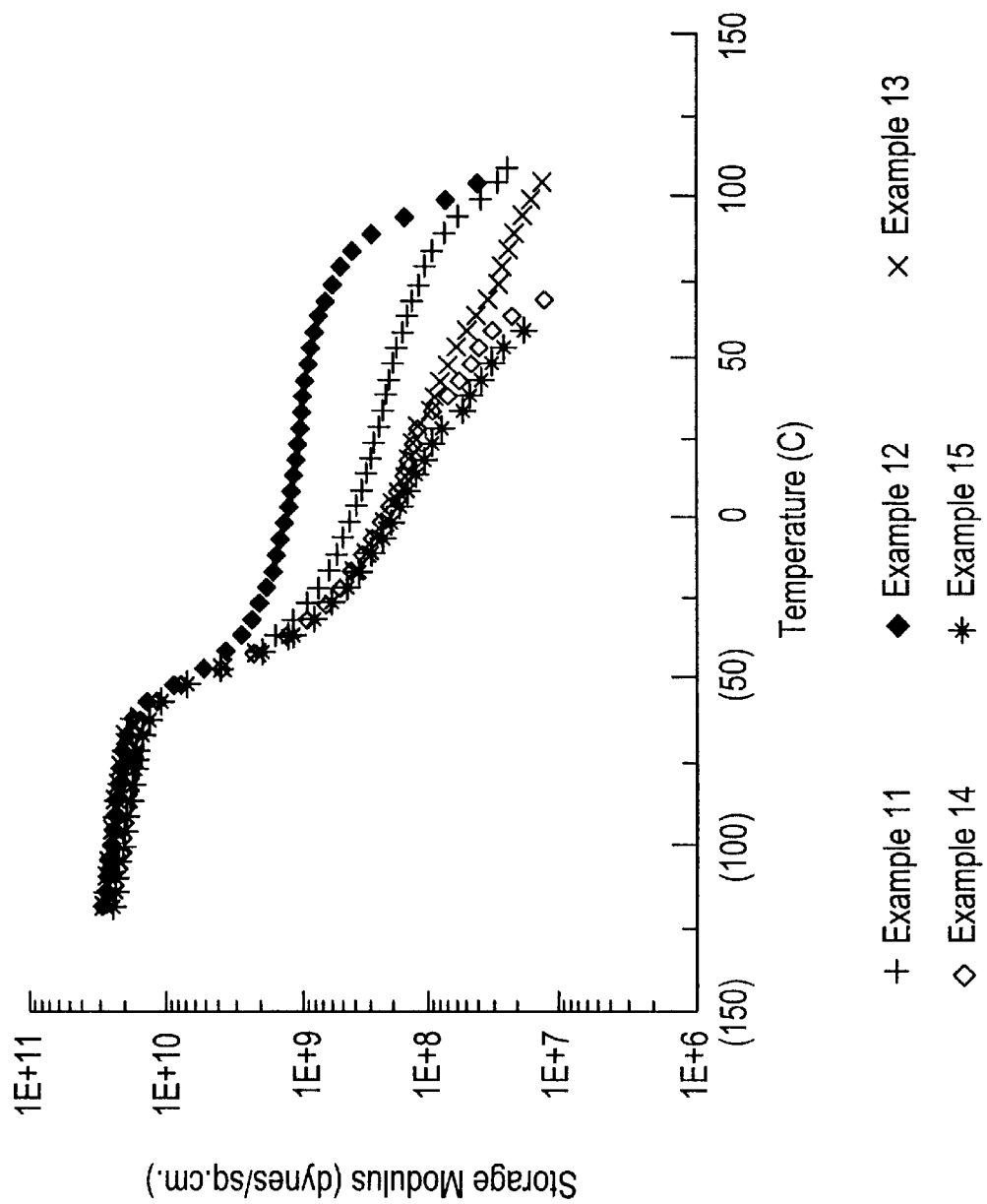
FIG. 7 is a plot of the dynamic storage modulus versus temperature for Examples 11–15 as determined using a Rheometrics Solid Analyzer RSA-II.
Figure 8:
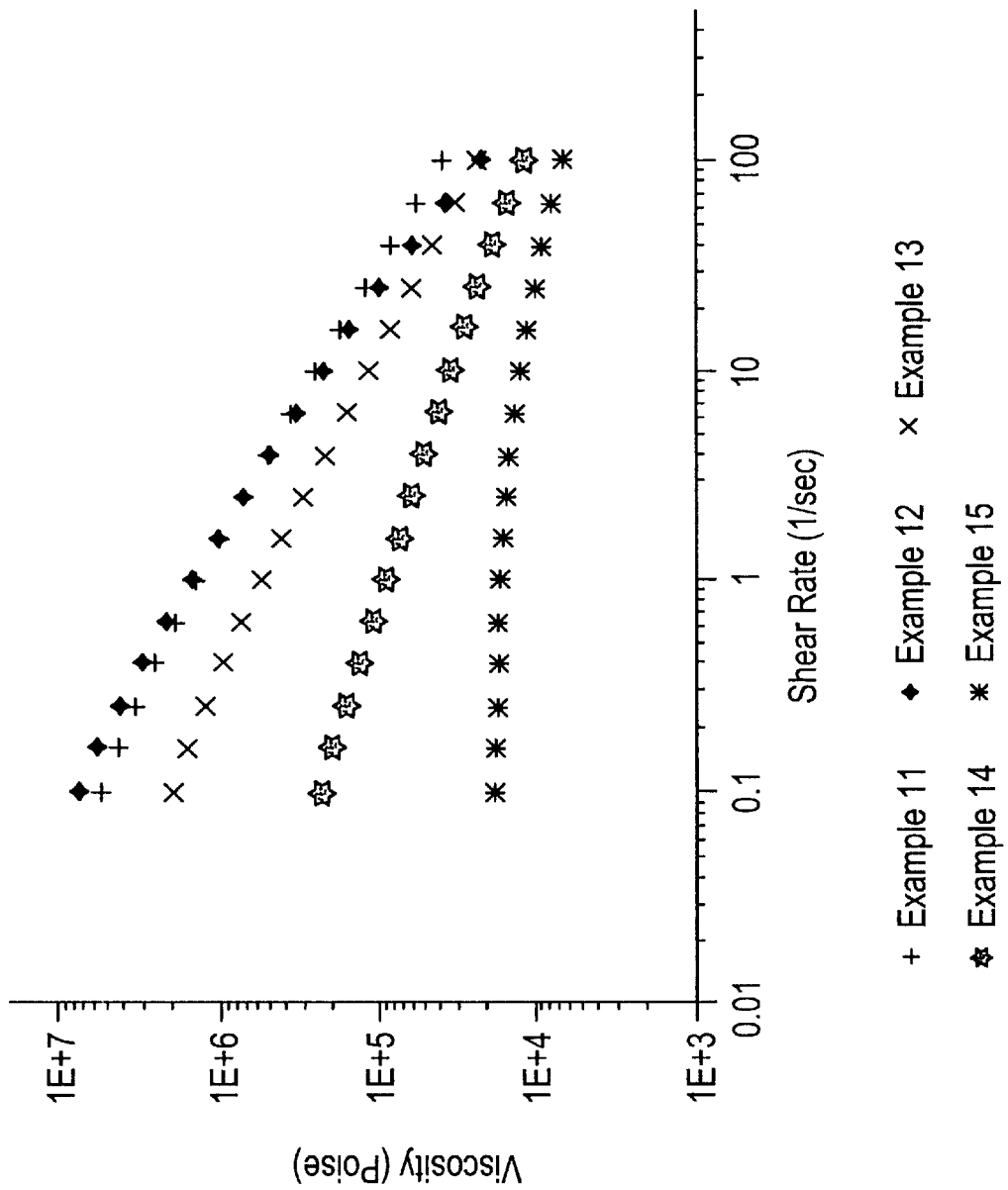
FIG. 8 is a plot of the dynamic complex viscosity versus shear rate for Examples 11–15 as determined using a Rheometrics Rheometer RMS-800 at 190° C.

In another evaluation using the same sample preparation and testing procedures indicated in Examples 1–5 above, similar results are obtained for blend compositions comprising KRATON G-1650 and ENGAGE EG8200. FIGS. 7 and 8 and Table 3 show that for blend compositions comprising less than 50 weight percent ENGAGE EG8200, the dynamic properties of such blends are substantially unchanged relative to neat KRATON G-1650.

TABLE 3

Elasticity of Styrene/Ethylene-Butene/Styrene Blends

| Example | Composition | Storage Modulus (E') at −26° C., dynes/cm² | Storage Modulus (E') at 24° C., dynes/cm² | −26°/ 24° C. Storage Modulus Ratio | Ratio of Blend to Neat Copolymer Storage Modulus at −26° C. | Ratio of Blend to Neat Copolymer Storage Modulus at 24° C. |
|---|---|---|---|---|---|---|
| 11 | 75% KRATON G1650 25% ENGAGE EG8200 | 9.13 × 10⁸ | 2.71 × 10⁸ | 3.37 | 0.44 | 0.25 |
| 12* | 100% KRATON G1650 | 2.08 × 10⁹ | 1.06 × 10⁹ | 1.96 | — | — |
| 13 | 50% KRATON G1650 50% ENGAGE EG8200 | 5.89 × 10⁸ | 1.31 × 10⁸ | 4.50 | 0.28 | 0.12 |
| 14* | 25% KRATON G1650 75% ENGAGE EG8200 | 6.34 × 10⁸ | 1.27 × 10⁸ | 4.99 | 0.30 | 0.12 |
| 15* | 100% ENGAGE EG8200 | 5.77 × 10⁸ | 8.92 × 10⁷ | 6.46 | 0.28 | 0.08 |

*Comparative example only; not an example of the present invention.

Examples 6, 7, 17–20

Figure 9:
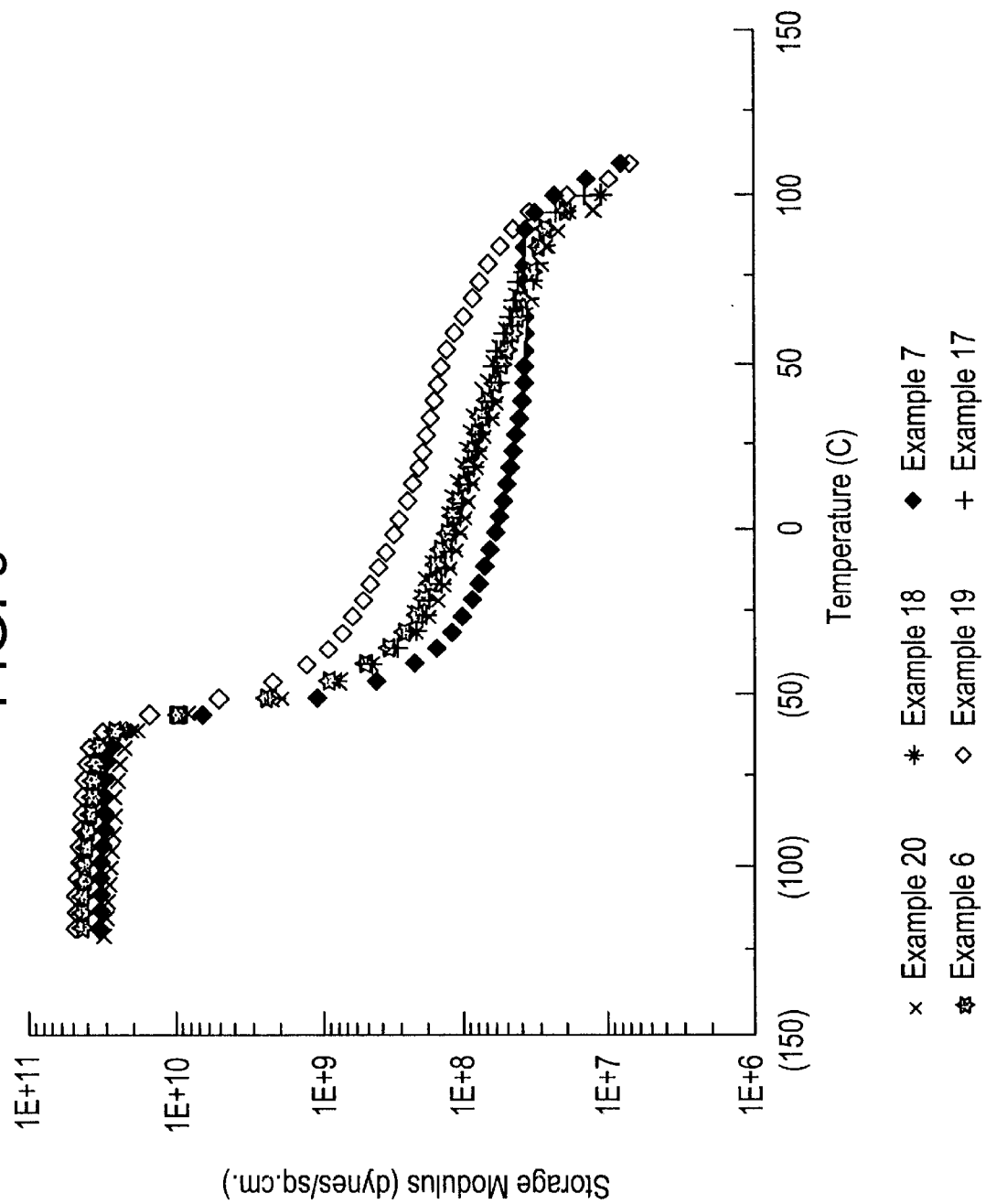
FIG. 9 is a plot of the dynamic storage modulus versus temperature for Examples 6, 7, 17–20 as determined using a Rheometrics Solid Analyzer RSA-II.

In another evaluation, the above Haake torque sample preparation and dynamic mechanical testing procedures are performed using 25 weight percent of several different thermoelastic polymers in a VECTOR 4211 block copolymer. The thermoelastic polymers include ENGAGE EG8200, ATTANE 4203, TAFMER P0480, EXACT 3027 and an 18 weight percent vinyl acetate EVA copolymer. Table 4 shows the description of the blend compositions and their respective storage modulus data. FIG. 9 shows the storage modulus versus temperature data for the blend compositions. FIG. 9 and Table 4 indicate all the thermoelastic polymers in the evaluation function as a substantially inert extender for VECTOR 4211, except the EVA copolymer. While the −26° to 24° C. storage modulus ratio of the EVA blend composition (Example 19) is low and similar to the other thermoelastic blend compositions in the evaluation, the storage modulus of the EVA blend composition at −26° C. and 24° C. is several times higher (i.e., 4.3 and 5.92 times higher) than that for the corresponding neat block copolymer (Example 7).

Example of Melt Fusion for Block Copolymer with Saturated Rubber Units

Figure 10:
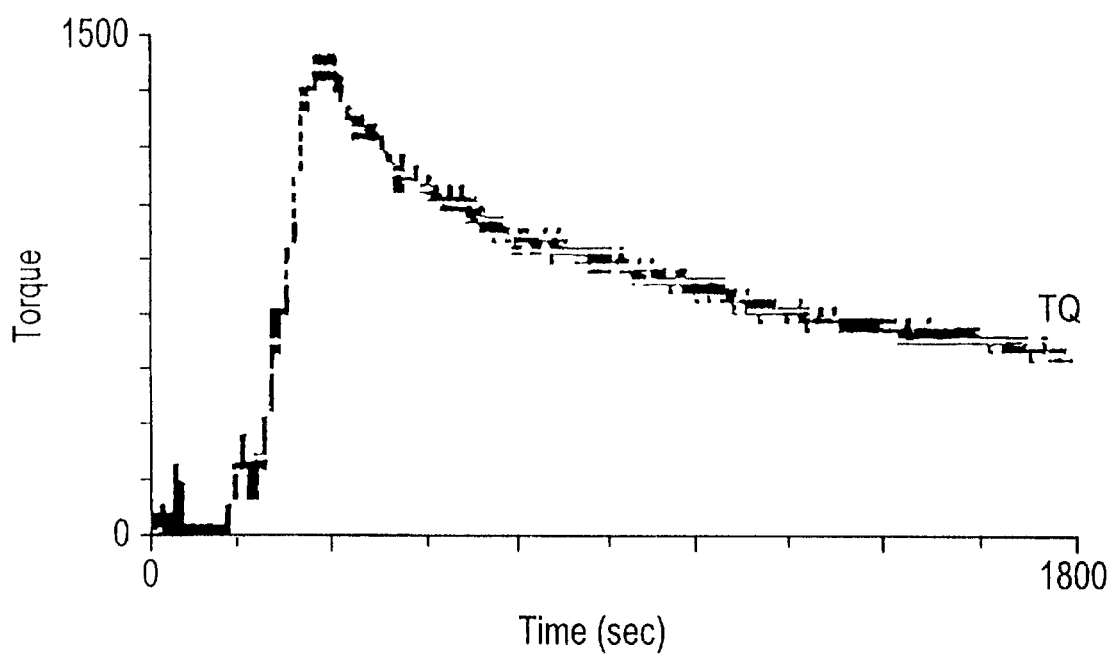
FIG. 10 is a plot of the Haake torque response versus time for Example 12 at 240° C. as determined using Haake torque mixer.
Figure 11:
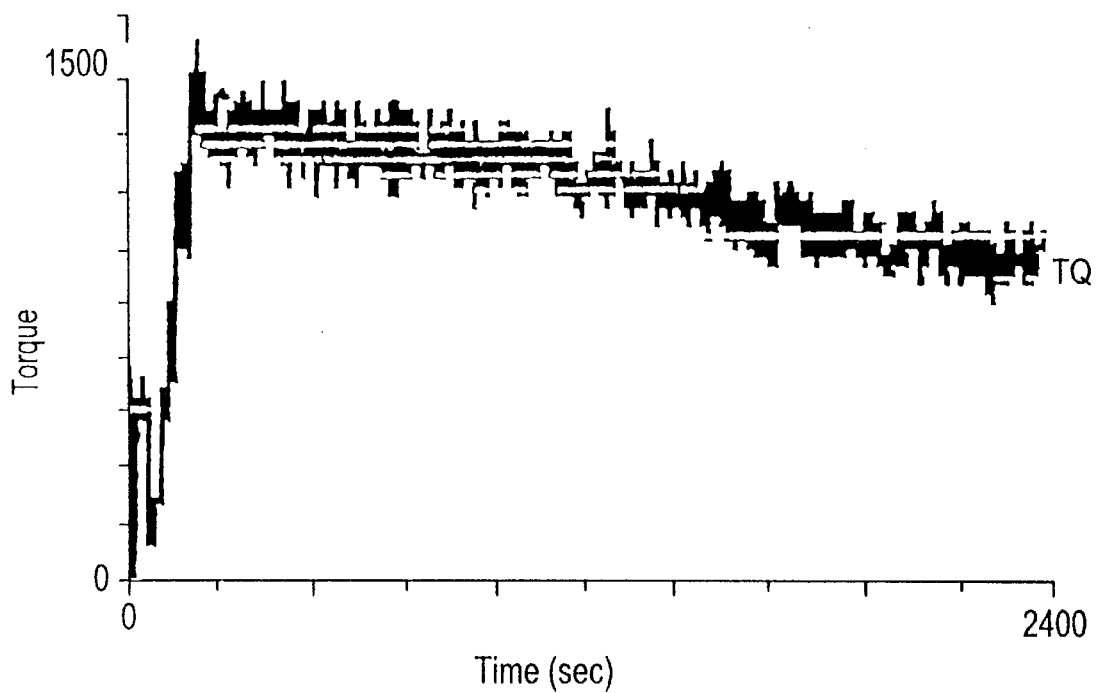
FIG. 11 is a plot of the Haake torque response versus time for Example 11 at 240° C. as determined using Haake torque mixer.

In still another evaluation the response of KRATON G1650 to thermal processing is determined in a Haake torque mixer. As shown in FIGS. 10 and 11, Haake torque evaluation results indicate that ENGAGE EG8200 functions as a fusion promoter and substantially improves the pro-

TABLE 4

Blend Composition Descriptions
For Various Thermoelastic Polymers at 25 Weight Percent

| Example | Composition | Storage Modulus (E') at −26° C., dynes/cm$^2$ | Storage Modulus (E') at 24° C., dynes/cm$^2$ | −26°/ 24° C. Storage Modulus Ratio | Ratio of Blend to Neat Copolymer Storage Modulus at −26° C. | Ratio of Blend to Neat Copolymer Storage Modulus at 24° C. |
|---|---|---|---|---|---|---|
| 6 | 75% VECTOR 4211 25% ENGAGE EG8200 | 2.26 × 10$^8$ | 8.99 × 10$^7$ | 2.51 | 2.13 | 1.95 |
| 7* | 100% VECTOR 4211 | 1.06 × 10$^8$ | 4.60 × 10$^7$ | 2.30 | — | — |
| 17 | 75% VECTOR 4211 25% ATTANE 4203 | 2.02 × 10$^8$ | 8.59 × 10$^7$ | 2.35 | 1.91 | 1.87 |
| 18 | 75% VECTOR 4211 25% TAFMER P0480 | 1.87 × 10$^8$ | 8.12 × 10$^7$ | 2.30 | 1.76 | 1.77 |
| 19* | 75% VECTOR 4211 25% EVA (18% VA) | 6.27 × 10$^8$ | 1.98 × 10$^8$ | 3.17 | 5.92 | 4.30 |
| 20 | 75% VECTOR 4211 25% EXACT 3027 | 2.20 × 10$^8$ | 9.33 × 10$^7$ | 2.36 | 2.07 | 2.03 |

*Comparative example only; not an example of the present invention.

Examples 1,2, 20 and 21

Table 5 below indicates that although ATTANE 4403 does not appear to substantially alter the storage modulus/ elasticity of block copolymers, it does substantially alter the hardness of the VECTOR 8508 block copolymer at 25 weight percent addition levels and, as such, like EVA copolymers, is not a substantially inert thermoelastic extender within the purview of the present invention. Changes in Shore A hardness greater than about ±3 units (as measured by ASTM-D2240) is considered to be a substantial alteration. The inability of ATTANE 4203 to perform as an inert extender is believed to be due to its higher polymer density (i.e., 0.905 g/cc). Similarly, at least for compositions consisting essentially of block copolymers with unsaturated rubber monomer segments, as the density of the ethylene interpolymer used in the present invention decreases, proportionally higher amounts of the ethylene interpolymer are permissible while still maintaining the substantial inertness discovered by the Applicants. See Examples 3 and 8.

TABLE 5

Effect of Thermoelastic Polymers on Block Copolymer Hardness

| Example | Composition | Shore A Hardness |
|---|---|---|
| 1 | 75% VECTOR 8508 25% ENGAGE EG8200 | 73 |
| 2* | 100% VECTOR 8508 | 74 |
| 20 | 75% VECTOR 8508 25% TAFMER P0480 | 73 |
| 21* | 75% VECTOR 8508 25% ATTANE 4203 | 78 |

*Comparative example only; not an example of the present invention.

cessability of KRATON G1650. FIG. 10 shows the Haake torque of neat KRATON G1650 at 240° C. At 230° C., neat KRATON G1650 (Example 12 block copolymer) does not melt in a Haake torque mixer. At 240° C., an induction delay time of about 3 minutes is required to melt and fuse KRATON G1650 into a molten processable sample. In addition to the increase energy requirement, FIG. 10 indicates an additional processing disadvantage. As a consequence of the delay time, FIG. 10 indicates the neat block copolymer is rendered more susceptible to thermal scission (instability) as manifested by significant torque decreases over the test period.

Figure 12:
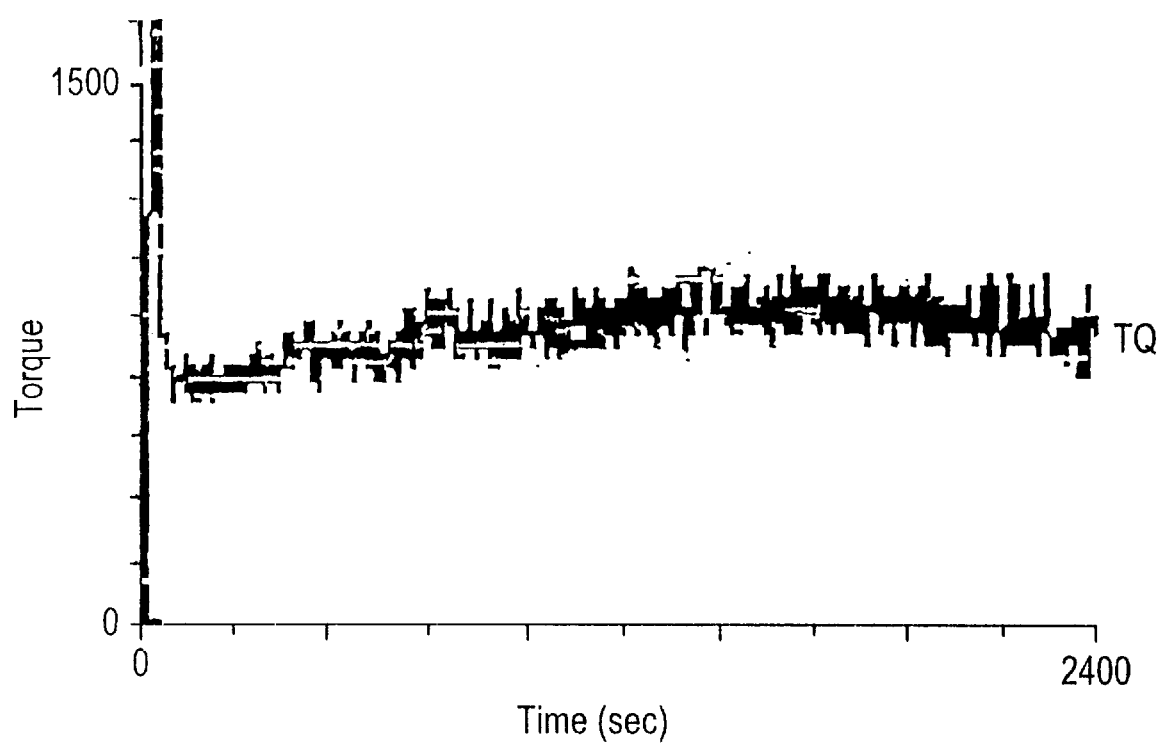
FIG. 12 is a plot of the Haake torque response versus time for Example 22 at 240° C. as determined using Haake torque mixer.

However, FIG. 11 indicates the addition of 25 weight percent of ENGAGE EG8200 (Example 11 blend composition) allows melting and fusion after about 1 minute of processing at a lower processing temperature, i.e., below 220° C. FIG. 11 also indicates the resultant blend composition is more thermally stable as indicated by a moderate torque increase over an extended test period. FIG. 12, where the blend composition comprises 50 weight percent TAFMER P0480 in KRATON G1650 (Example 22), indicates similar results regarding fusion and processibility enhancement are obtainable using TAFMER P0480.

Figure 13:
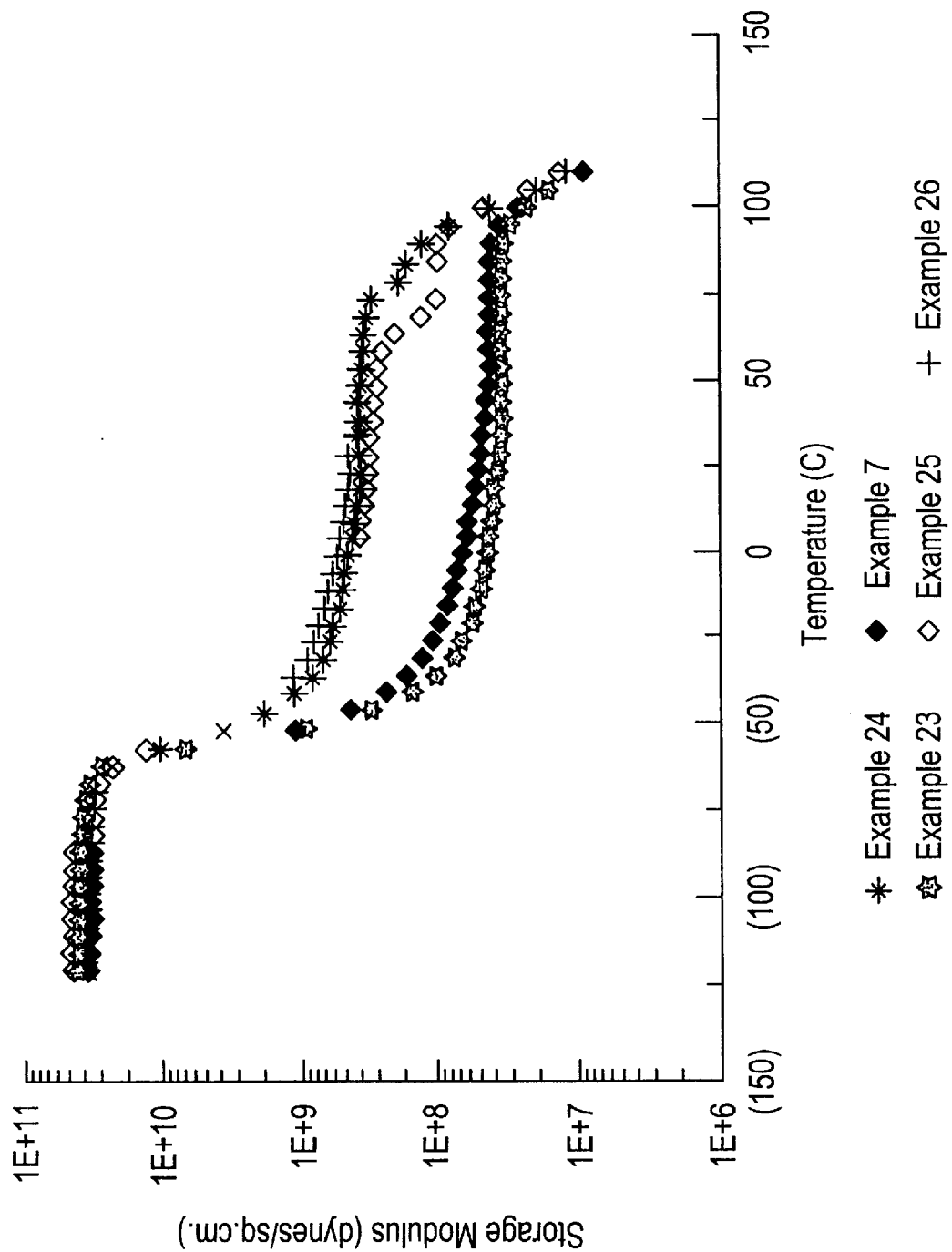
FIG. 13 is a plot of the dynamic storage modulus versus temperature for Examples 7,23–26 as determined using a Rheometrics Solid Analyzer RSA-II.

Example for Thermal Processing Improvement for Block Copolymer with Unsaturated Rubber Units In still another evaluation, the dynamic mechanical properties of VECTOR 4211 is repetitively determined with and without exposure to a Haake torque mixer as described in the blend composition sample preparation procedures above. Table 6 shows the sample descriptions for this evaluation and FIG. 13 shows the storage modulus elasticity data. A comparison between Examples 7 and 23 on the one hand and Examples 24–26 as plotted in FIG. 13 indicates VECTOR 4211 is highly sensitive to Haake torque exposure. Further, a comparison between Examples 24–26 as plotted in FIG. 13 and Examples 6,17,18 and 20 as plotted in FIG. 9 shows various thermoelastic polymers (i.e., ATTANE 4203, TAFMER P0480, EXACT 3027 and ENGAGE EG8200 at 25 weight percent loadings) can significantly improve the Haake thermal shear or processing stability of the KRATON G1650 block copolymer. That is, these polymers allow lower storage moduli throughout the temperature range of −26° C. to 24° C. that better approximates the neat, non-Haake exposed block copolymer (Examples 7 and 23) while the neat block copolymer shows higher storage moduli throughout the same range when processed in the Haake mixer (Examples 24–26). However, a comparison between EVA blend compositions at 25 and 50 weight percent in VECTOR 4211 as plotted in FIG. 9 with the neat, Haake expose block copolymers (Examples 24–26) as plotted in FIG. 12 indicates EVA does not provide similar improvements in thermal stability.

TABLE 6

Haake Exposure of VECTOR 4211

| Example | | Haake Exposure 7 min. at 60 rpm |
|---|---|---|
| 7* | 100% VECTOR 4211 | None |
| 23* | 100% VECTOR 4211 | None |
| 24* | 100% VECTOR 4211 | Yes |
| 25* | 100% VECTOR 4211 | Yes |
| 26* | 100% VECTOR 4211 | Yes |

*Comparative example only; not an example of the present invention.

We claim:

1. An extrudable and moldable thermoplastic elastomeric composition comprising (a) from about 50 to about 99 percent by weight, based on the total weight of the composition, of an unsaturated styrene triblock copolymer containing about 10 to 35 weight percent styrene and (b) from about 1 to about 50 percent by weight, based on the total weight of the composition, of a substantially linear ethylene interpolymer characterized as an interpolymer of ethylene with at least one $C_3$–$C_{20}$ α-olefin and having a density from about 0.865 to about 0.885 g/cc, wherein the composition is further characterized as having:
   i. storage moduli throughout the range of −26° C. to 24° C. of less than $3.5 \times 10^9$ dynes/cm$^2$,
   ii. a ratio of storage modulus at −26° C. to storage modulus at 24° C. of less than 3, and
   iii. storage moduli at −26° C. and 24° C. about 0.4 to about 2.2 times higher than the storage moduli at −26° C. and 24° C., respectively, of the neat styrene block copolymer portion of the composition,
and the substantially linear ethylene interpolymer is further characterized as having:
   iv. a melt flow ratio, $I_{10}/I_2$ from about 6 to about 15,
   v. a molecular weight distribution, $M_w/M_n$, defined by the equation:

$$M_w/M_n \leq (I_{10}/I_2) - 4.63, \text{ and}$$

vi. a critical shear rate at onset of surface melt fracture at least 50 percent greater than the critical shear rate at onset of surface melt fracture of a linear ethylene polymer having about the same $I_2$ and $M_w/M_n$.

2. The composition of claim 1 wherein 25 percent by weight of the total composition is the unsaturated styrene triblock copolymer.

3. The composition of claim 1 wherein the unsaturated styrene triblock copolymer is selected from the group consisting of styrene/butadiene/styrene, styrene/isoprene/styrene, α-methylstyrene/butadiene/α-methylstyrene, and α-methyl-styrene/isoprene/α-methylstyrene block copolymers.

4. The composition of claim 1 wherein the unsaturated styrene triblock copolymer is a styrene/butadiene/styrene block copolymer.

5. The composition of claim 1 wherein the unsaturated styrene triblock copolymer is a styrene/isoprene/styrene block copolymer.

6. The composition of claim 1 wherein the $C_3$–$C_{20}$ α-olefin is selected from the group consisting of propylene, isobutylene, 1-butene, 1-hexene, 4-methyl-1-pentene, 1-heptene, 1-octene, 1-nonene, and 1-decene.

7. The composition of claim 1 wherein the substantially linear ethylene interpolymer is a copolymer of ethylene and a $C_3$–$C_{20}$ α-olefin.

8. The composition of claim 7 wherein the substantially linear ethylene interpolymer is a substantially linear ethylene/1-octene copolymer.

9. A fabricated article in the form of a film, fibers or a molded article comprising (a) from about 50 to about 99 percent by weight, based on the total weight of the composition, of an unsaturated styrene triblock copolymer containing about 10 to 35 weight percent styrene and (b) from about 1 to about 50 percent by weight, based on the total weight of the composition, of a substantially linear ethylene interpolymer characterized as an interpolymer of ethylene with at least one $C_3$–$C_{20}$ α-olefin and having a density from about 0.865 to about 0.885 g/cc, wherein the composition is further characterized as having:
   i. storage moduli throughout the range of −26° C. to 24° C. of less than $3.5 \times 109$ dynes/cm$^2$,
   ii. a ratio of storage modulus at −26° C. to storage modulus at 24° C. of less than 3, and
   iii. storage moduli at −26° C. and 24° C. about 0.4 to about 2.2 times higher than the storage moduli at −26° C. and 24° C., respectively, of the neat styrene block copolymer portion of the composition,
and the substantially linear ethylene interpolymer is further characterized as having:
   iv. a melt flow ratio, $I_{10}/I_2$ from about 6 to about 15,
   v. a molecular weight distribution, $M_w/M_n$, defined by the equation:

$$M_w/M_n \leq (I_{10}/I_2) - 4.63, \text{ and}$$

vi. a critical shear rate at onset of surface melt fracture at least 50 percent greater than the critical shear rate at onset of surface melt fracture of a linear ethylene polymer having about the same $I_2$ and $M_w/M_n$.

10. The composition of claim 1 further comprising another natural or synthetic resins selected from the group consisting of rubbers, linear low density polyethylene (LLDPE), high density polyethylene (HDPE), low density polyethylene (LDPE), ethylene-vinyl acetate copolymer (EVA), ethylene-carboxylic acid copolymers, ethylene acrylate copolymers, polybutylene (PB), nylons, polycarbonates, polyesters, polypropylene, ethylene-propylene interpolymers, ethylene-propylene rubber, EPDM, chlorinated polyethylene, thermoplastic vulcanates, polyurethanes and graft-modified olefin polymers.

11. The composition of claim 10 wherein the other natural or synthetic resins is a polypropylene polymer.

* * * * *